United States Patent [19]
Sato et al.

[11] Patent Number: 5,867,631
[45] Date of Patent: Feb. 2, 1999

[54] MANIPULATOR SIMULATION METHOD AND APPARATUS

[75] Inventors: Yuichi Sato; Mitsunori Hirata; Tsugito Maruyama, all of Kawasaki, Japan

[73] Assignee: Fujitsu Limited, Kawasaki, Japan

[21] Appl. No.: 618,808

[22] Filed: Mar. 20, 1996

[30] Foreign Application Priority Data

Aug. 10, 1995 [JP] Japan ................................. 7-204186

[51] Int. Cl.⁶ ............................. G06F 17/16; B25J 9/10
[52] U.S. Cl. ........................... 395/97; 395/500; 364/578
[58] Field of Search ................................ 395/94, 86, 98, 395/97; 364/513, 167.01, 578; 318/568.19, 561, 568.1; 356/375; 74/490.01

[56] References Cited

U.S. PATENT DOCUMENTS

| | | | |
|---|---|---|---|
| 4,884,216 | 11/1989 | Kuperstein | 364/513 |
| 4,967,126 | 10/1990 | Gretz et al | 318/568.19 |
| 4,999,553 | 3/1991 | Seraji | 318/561 |
| 5,049,796 | 9/1991 | Seraji | 318/568.1 |
| 5,177,563 | 1/1993 | Everett et al. | 356/375 |
| 5,294,873 | 3/1994 | Seraji | 318/568.1 |
| 5,297,238 | 3/1994 | Wang et al. | 395/94 |
| 5,347,616 | 9/1994 | Minami | 395/86 |
| 5,430,643 | 7/1995 | Seraji | 364/167.01 |
| 5,528,955 | 6/1996 | Hannaford et al. | 74/490.01 |
| 5,542,028 | 7/1996 | Minami | 395/86 |
| 5,550,953 | 8/1996 | Seraji | 395/98 |
| 5,602,968 | 2/1997 | Volpe | 395/97 |
| 5,642,468 | 6/1997 | Lee et al. | 395/97 |

OTHER PUBLICATIONS

"Kinematic Analysis and Control of a 7–DOF Redundant Telerobot Manipulator", by C. Nguyen et al., IEEE Industrial Electronics, Control, and Instrumentation, Feb. 1990, pp. 71–77.

"A Graphics Environment for Dynamics Modelling and Motion Control of Robot Manipulators", by S. Amin et al., IEEE System Theory, 1990 Southeastern Symposium, Sep. 1991, pp. 1087–1091.

"A Fast Procedure for Manipulator Inverse Kinematics Evaluation and Pseudoinverse Robustness", by R. Mayorga et al., IEEE Transactions on Systems, Man, and Cybernetics, vol. 22, No. 4, Jul./Aug. 1992, pp. 790–798.

"A Fuzzy Learning Algorithm for Kinematic Control of a Robotic System", by R. Graca et al., IEEE Decision and Control, 1993 32nd Annual Conference, pp. 1274–1279.

"Error State Controller for Robotic Manipulator", by Yun–sheng Zhang, IEEE Industrial Technology, 1994 Int'l. Conference, pp. 34–38.

*Primary Examiner*—Kevin J. Teska
*Assistant Examiner*—Russell W. Frejd
*Attorney, Agent, or Firm*—Staas & Halsey

[57] ABSTRACT

An apparatus, and method of use therefor, adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator. A matrix equation is evaluated beforehand in accordance with a mathematical expression processing. Parameters, which represent a figure of the manipulator, are inputted into the resultant matrix equation. Further, the information representative of position and orientation of the tip of the manipulator is entered to evaluate the angles of rotation of joints in accordance with a numerical resolution.

12 Claims, 6 Drawing Sheets

MANIPULATOR SIMULATION METHOD AND APPARATUS

BACKGROUND OF THE INVENTION

1. Field of the Invention

The present invention relates to a manipulator simulation method and apparatus adapted to evaluate angles of rotation of joints for coupling arm-to-arm to each other on the basis of information representative of position and attitude or orientation of a tip of a manipulator having six or less arms, which are sequentially coupled with each other, so as to implement the position and the attitude or orientation of the tip of the manipulator.

2. Description of the Related Art

FIG. 9 is a typical illustration of an example of a manipulator comprising a plurality of arms and joints for coupling the arms to each other.

In FIG. 9, a plurality of arms $2\_1, 2\_2, \ldots, 2\_5$ are sequentially coupled with each other by joints $3\_1, 3\_2, \ldots, 3\_5$ on a substrate or a base 1. A hand 4 is coupled with the top arm $2\_5$. The hand 4 serves to grasp a work object 5 and let loose the same through switching of a finger $4a$ constituting the hand 4. The joints $3\_1, 3\_2, \ldots, 3\_5$ are arranged in such a manner that the arms $2\_1, 2\_2, \ldots, 2\_5$ coupled with each other by joints $3\_1, 3\_2, \ldots, 3\_5$ are rotatably movable. The use of such a manipulator makes it possible to perform, through a rotatable movement of the arms such that the hand 4 of the tip of the arms $2\_1, 2\_2, \ldots, 2\_5$ is in a predetermined position and takes a predetermined attitude, a work, for example, such that the work object 5 is grasped and carried to another position.

It is referred to as the inverse kinematics that in the manipulator arranged, for example, as illustrated in FIG. 9, information as to the position and orientation of the tip of the manipulator is provided, so that angles of the respective joints are evaluated to move the tip of the manipulator to the given position with the given attitude.

Such inverse kinematics are applicable to the following fields (1) Robots

For a robot having an arbitrary link configuration, the inverse kinematics is automatically solved, so that applications to the work plans of the robot are facilitated.

(2) CAD systems for a mechanism design

Incorporation of the inverse kinematics into the CAD system for a mechanism design, in which a design for parts having a link mechanism is often performed, makes it possible to simulate beforehand as to whether products having the link mechanism operate as desired.

(3) Production of an animation in the multimedia

In the multimedia, various applications in mixing of computer graphics, video and audio are expected. On the other hand, in the field of the commercial and a movie, it is desired to produce an animation, which is high in reality, using the computer graphics. Hitherto, in the field of the computer graphics, the animation is produced on an off-line basis. Particularly, with regard to a motion for an android model, there have been adopted a very troublesome scheme in which an angle is designated for each joint and a motion capturing scheme in which a specific sensor is attached to the human body so as to take in the motion into a computer. Incorporation of the inverse kinematics into an animation producing tool makes it possible to very efficiently produce a motion of the animation model such as the android.

(4) Ergonomics

Hitherto, in a design of products having some contact with the human, such as chairs, desks, keyboards and the like, there is seen a lack of arguments as to the readiness-to-use, the operability, and the amenity on an ergonomics basis. It is noted, however, that incorporation of the inverse kinematics into the android model produced by the computer graphics makes it possible to perform an inspection of manufactured goods through various motions of the android model at the stage of the simulation.

Hitherto, in connection with the problem of the inverse kinematics, in a case where analytic solutions exist, an algebraic operation is performed one by one for each object to evaluate the analytic solution. In this case, it is difficult to discriminate between the case of the existence of the analytic solution and the case of the non-existence of the analytic solution. This involves a lack of generality for a system in its entirety. Further, in a design, even a manipulator having the analytic solutions, when such a manipulator is manufactured indeed, it happens that the calibration involves a minor offset and as a result the inverse kinematics with the analytic solution is not useful.

On the other hand, in connection with the case of non-existence of the analytic solution, there has been developed a method referred to as a homotopy scheme or a continuation scheme in which the precision is improved by means of repeating the numerical solution starting from the approximate solution, specifically, constituting a predictor-corrector on a Newton-Raphson basis.

This method involves, however, the following drawbacks and cannot be used practically.

(1) There is a case where numerical instability exists.

(2) There is not seen dependency to the physical constant (D-H parameter).

(3) A calculation load is large.

SUMMARY OF THE INVENTION

In view of the foregoing, it is therefore an object of the present invention to provide a manipulator simulation method and apparatus capable of solving the inverse kinematics at higher speed as compared with the prior art.

To achieve the above-mentioned objects, according to the present invention, there is provided a first manipulator simulation method adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ and representative of the position and the orientation of the tip of the manipulator looking at an absolute coordinate system is expressed by $$A_{hand} = \left[ \begin{array}{c|c} C_{hand} & t_{hand} \\ \hline 0 & 1 \end{array} \right] = \left[ \begin{array}{ccc|c} n_x & s_x & a_x & p_x \\ n_y & s_y & a_y & p_y \\ n_z & s_z & a_z & p_z \\ \hline 0 & 0 & 0 & 1 \end{array} \right]$$

where $C_{hand}$ denotes an orientation, and $t_{hand}$ denotes a position, and the homogeneous coordinates transformation matrix $A_i$ representative of the position and the orientation of the (i+1)th coordinate system looking at the i-th coordinate system, of all the coordinate systems sequentially assigned from the rear end of the manipulator toward the top, is expressed by $$A_i = \left[ \begin{array}{c|c} C_i & C_{z,i} \cdot t_i \\ \hline 0 & 1 \end{array} \right]$$

where:

i=1, 2, . . . , 6

$C_i = C_{z,i} \cdot C_{x,i}$ $$C_{z,i} = \begin{bmatrix} c_i & -s_i & 0 \\ s_i & c_i & 0 \\ 0 & 0 & 1 \end{bmatrix}$$

$$C_{x,i} = \begin{bmatrix} 1 & 0 & 0 \\ 0 & \lambda_i & -\mu_i \\ 0 & \mu_i & \lambda_i \end{bmatrix}$$

$c_i = \cos\theta_i$, $s_i = \sin\theta_i$ $\lambda_i = \cos\alpha_i$, $\mu_i = \sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix, a matrix equation (1) is evaluated based on said homogeneous coordinates transformation matrix $A_{hand}$ and said homogeneous coordinates transformation matrix $A_i$, $$U \cdot \xi \cdot (1 + x_1^2)(1 + x_2^2) = V \cdot \left[ \begin{array}{c} x_3 \cdot \rho \\ \rho \end{array} \right] \quad (1)$$

where

U denotes 20×16 of real number matrix,

V denotes 20×18 of real number matrix, $\xi = [x_3 s_4 s_5, x_3 s_4 c_5, x_3 c_4 s_5, x_3 c_4 c_5, x_3 s_4, x_3 c_4, x_3 s_5,$
$\quad x_3 c_5, s_4 s_5, s_4 c_5, c_4 s_5, c_4 c_5, s_4, c_4, s_5, c_5]^T$, $\rho = [x_1^2 x_2^2, x_1^2 x_2, x_1^2, x_1 x_2^2, x_1 x_2, x_1, x_2^2, x_2, 1]^T$, and $X_i = \tan(\theta_i/2)$, by a numerical value substitution of respective components of the parameter $t_i$ into the matrix equation expressed by equation (1), derived is a matrix equation expressed by equation (2) in which respective components of said homogeneous coordinates transformation matrix $A_{hand}$ are given as variables, $$U(A_{hand}) \cdot \xi \cdot (1 + x_1^2)(1 + x_2^2) = V(A_{hand}) \cdot \left[ \begin{array}{c} x_3 \cdot \rho \\ \rho \end{array} \right] \quad (2)$$

where $U(A_{hand})$ and $V(A_{hand})$ stand for matrices in which the respective components of said homogeneous coordinates transformation matrix $A_{hand}$ are given as variables, said matrices being produced by numerical value substitution of respective components of the parameter $t_i$ into said matrices U and V, respectively, by a numerical value substitution of the respective components of said homogeneous coordinates transformation matrix $A_{hand}$ into the matrix equation expressed by equation (2), derived is a numerical value matrix equation expressed by equation (3), $$U_{num} \cdot \xi \cdot (1 + x_1^2)(1 + x_2^2) = V_{num} \cdot \left[ \begin{array}{c} x_3 \cdot \rho \\ \rho \end{array} \right] \quad (3)$$

where $U_{num}$ and $V_{num}$ stand for numerical value matrices produced by numerical value substitution of the respective components of said homogeneous coordinates transformation matrix $A_{hand}$ into said matrices $U(A_{hand})$ and $V(A_{hand})$, respectively, and angles $\theta_i^{(k)}$ of rotation (k stands for positive integers to the maximum 16 for discriminating mutually between a plurality of angles $\theta_i$) of the joints are evaluated on the basis of the numerical value matrix equation expressed by equation (3).

Here, it is acceptable to adopt a manipulator simulation method, wherein to evaluate said angles $\theta_i^{(k)}$ of rotation on the basis of the numerical value matrix equation expressed by equation (3):

equations, in which $\theta_4$ and $\theta_5$ are eliminated, are evaluated on the basis of the numerical value matrix equation given by equation (3);

eigenvalue equations or generalized eigenvalue equations are evaluated on the basis of the resultant equations in which $\theta_4$ and $\theta_5$ are eliminated; and said angles $\theta_i^{(k)}$ of rotation are evaluated on the basis of the resultant eigenvalue equations or generalized eigenvalue equations.

Further, to achieve the above-mentioned objects, according to the present invention, there is provided a second manipulator simulation method adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ representative of the position and the orientation of the tip of the manipulator looking at an absolute coordinate system is expressed by $$A_{hand} = \left[ \begin{array}{c|c} C_{hand} & t_{hand} \\ \hline 0 & 1 \end{array} \right] = \left[ \begin{array}{ccc|c} n_x & s_x & a_x & p_x \\ n_y & s_y & a_y & p_y \\ n_z & s_z & a_z & p_z \\ \hline 0 & 0 & 0 & 1 \end{array} \right]$$

where $C_{hand}$ denotes an orientation, and $t_{hand}$ denotes a position, and the homogeneous coordinates transformation matrix $A_i$ representative of the position and the orientation of the (i+1)th coordinate system looking at the i-th coordinate system, of all the coordinate systems sequentially assigned from the rear end of the manipulator toward the top, is expressed by $$A_i = \left[ \begin{array}{c|c} C_i & C_{z,i} \cdot t_i \\ \hline 0 & 1 \end{array} \right]$$

where:

i=1, 2, . . . , 6

$C_i = C_{z,i} \cdot C_{x,i}$ $$C_{z,i} = \begin{bmatrix} c_i & -s_i & 0 \\ s_i & c_i & 0 \\ 0 & 0 & 1 \end{bmatrix}$$

$$C_{x,i} = \begin{bmatrix} 1 & 0 & 0 \\ 0 & \lambda_i & -\mu_i \\ 0 & \mu_i & \lambda_i \end{bmatrix}$$

$c_i = \cos\theta_i$, $s_i = \sin\theta_i$ $\lambda_i = \cos\alpha_i$, $\mu_i = \sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix, a matrix equation (1) is evaluated based on said homogeneous coordinates transformation matrix $A_{hand}$ and said homogeneous coordinates transformation matrix $A_i$, $$U \cdot \xi \cdot (1 + x_4^2)(1 + x_5^2) = V \cdot \begin{bmatrix} x_3 \cdot \rho \\ \rho \end{bmatrix} \quad (4)$$

where

U denotes 20×16 of real number matrix,

V denotes 20×18 of real number matrix, $$\xi = [x_3 s_1 s_2, x_3 s_1 c_2, x_3 c_1 s_2, x_3 c_1 c_2, x_3 s_1, x_3 c_1, x_3 s_2,$$
$$x_3 c_2, s_1 s_2, s_1 c_2, c_1 s_2, c_1 c_2, s_1, c_1, s_2, c_2]^T$$

$\rho = [x_4^2 x_5^2, x_4^2 x_5, x_4^2, x_4 x_5^2, x_4 x_5, x_4, x_5^2, x_5, 1]^T$ $x_i = \tan(\theta_i/2)$, by a numerical value substitution of respective components of the parameter $t_i$ into the matrix equation expressed by equation (4), derived is a matrix equation expressed by equation (5) in which respective components of said homogeneous coordinates transformation matrix $A_{hand}$ are given as variables, $$U(A_{hand}) \cdot \xi \cdot (1 + x_4^2)(1 + x_5^2) = V(A_{hand}) \cdot \begin{bmatrix} x_3 \cdot \rho \\ \rho \end{bmatrix} \quad (5)$$

where $U(A_{hand})$ and $V(A_{hand})$ stand for matrices in which the respective components of said homogeneous coordinates transformation matrix $A_{hand}$ are given as variables, said matrices being produced by numerical value substitution of respective components of the parameter $t_i$ into said matrices U and V, respectively, by numerical substitution of the respective components of said homogeneous coordinates transformation matrix $A_{hand}$ into the matrix equation expressed by equation (5), derived is a numerical value matrix equation expressed by equation (6), $$U_{num} \cdot \xi \cdot (1 + x_4^2)(1 + x_5^2) = V_{num} \cdot \begin{bmatrix} x_3 \cdot \rho \\ \rho \end{bmatrix} \quad (6)$$

where $U_{num}$ and $V_{num}$ stand for numerical value matrices produced by numerical value substitution of the respective components of said homogeneous coordinates transformation matrix $A_{hand}$ into said matrices $U(A_{hand})$ and $V(A_{hand})$, respectively, and angles $\theta_i^{(k)}$ of rotation (k stands for positive integers to the maximum 16 for discriminating mutually between a plurality of angles $\theta_i$) of the joints are evaluated on the basis of the numerical value matrix equation expressed by equation (6).

Here, it is acceptable to adopt a manipulator simulation method, wherein to evaluate said angles $\theta_i^{(k)}$ of rotation on the basis of the numerical value matrix equation expressed by equation (6):

equations, in which $\theta_1$ and $\theta_2$ are eliminated, are evaluated on the basis of the numerical value matrix equation given by equation (6);

eigenvalue equations or generalized eigenvalue equations are evaluated on the basis of the resultant equations in which $\theta_1$ and $\theta_2$ are eliminated; and said angles $\theta_i^{(k)}$ of rotation are evaluated on the basis of the resultant eigenvalue equations or generalized eigenvalue equations.

Furthermore, to achieve the above-mentioned objects, according to the present invention, there is provided a first manipulator simulation apparatus adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ and representative of the position and the orientation of the tip of the manipulator looking at an absolute coordinate system is expressed by $$A_{hand} = \left[ \begin{array}{c|c} C_{hand} & t_{hand} \\ \hline 0 & 1 \end{array} \right] = \left[ \begin{array}{ccc|c} n_x & s_x & a_x & p_x \\ n_y & s_y & a_y & p_y \\ n_z & s_z & a_z & p_z \\ \hline 0 & 0 & 0 & 1 \end{array} \right]$$

where $C_{hand}$ denotes an orientation, and $t_{hand}$ denotes a position, and the homogeneous coordinates transformation matrix $A_i$ representative of the position and the orientation of the (i+1)th coordinate system looking at the i-th coordinate system, of all the coordinate systems sequentially assigned from the rear end of the manipulator toward the top, is expressed by $$A_i = \left[ \begin{array}{c|c} C_i & C_{z,i} \cdot t_i \\ \hline 0 & 1 \end{array} \right]$$

where:

i = 1, 2, . . . , 6

$C_i = C_{z,i} \cdot C_{x,i}$ $$C_{z,i} = \begin{bmatrix} c_i & -s_i & 0 \\ s_i & c_i & 0 \\ 0 & 0 & 1 \end{bmatrix}$$

$$C_{x,i} = \begin{bmatrix} 1 & 0 & 0 \\ 0 & \lambda_i & -\mu_i \\ 0 & \mu_i & \lambda_i \end{bmatrix}$$

$c_i = \cos\theta_i$, $s_i = \sin\theta_i$ $\lambda_i=\cos\alpha_i$, $\mu_i=\sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix, said apparatus comprises:

storage means for storing a matrix equation (1) evaluated based on said homogeneous coordinates transformation matrix $A_{hand}$ and said homogeneous coordinates transformation matrix $A_i$, $$U \cdot \xi \cdot (1 + x_1^2)(1 + x_2^2) = V \cdot \begin{bmatrix} x_3 \cdot \rho \\ \rho \end{bmatrix} \quad (1)$$

where

U denotes 20×16 of real number matrix,
V denotes 20×18 of real number matrix, $$\xi = [x_3s_4s_5, x_3s_4c_5, x_3c_4s_5, x_3c_4c_5, x_3s_4, x_3c_4, x_3s_5,$$
$$x_3c_5, s_4s_5, s_4c_5, c_4s_5, c_4c_5, s_4, c_4, s_5, c_5]^T,$$

$$\rho = [x_1^2x_2^2, x_1^2x_2, x_1^2, x_1x_2^2, x_1x_2, x_1, x_2^2, x_2, 1]^T,$$

and $X_i = \tan(\theta_i/2)$;

first input means for inputting respective components of the parameter $t_i$ in the form of numerical value;

parameter numerical value substitution means for, by a numerical value substitution of respective components of the parameter $t_i$ entered through said first input means into the matrix equation expressed by equation (1), deriving a matrix equation expressed by equation (2) in which respective components of said homogeneous coordinates transformation matrix $A_{hand}$ are given as variables, $$U(A_{hand}) \cdot \xi \cdot (1 + x_1^2)(1 + x_2^2) = V(A_{hand}) \cdot \begin{bmatrix} x_3 \cdot \rho \\ \rho \end{bmatrix} \quad (2)$$

where $U(A_{hand})$ and $V(A_{hand})$ stand for matrices in which the respective components of said homogeneous coordinates transformation matrix $A_{hand}$ are given as variables, said matrices being produced by numerical value substitution of respective components of the parameter $t_i$ into said matrices U and V, respectively;

second input means for inputting respective components of said homogeneous coordinates transformation matrix $A_{hand}$ in the form of numerical value;

numerical value matrix equation derivation means for, by numerical value substitution of the respective components of said homogeneous coordinates transformation matrix $A_{hand}$ entered through said second input means into the matrix equation expressed by equation (2), deriving a numerical value matrix equation expressed by equation (3), $$U_{num} \cdot \xi \cdot (1 + x_1^2)(1 + x_2^2) = V_{num} \cdot \begin{bmatrix} x_3 \cdot \rho \\ \rho \end{bmatrix} \quad (3)$$

where $U_{num}$ and $V_{num}$ stand for numerical value matrices produced by numerical substitution of the respective components of said homogeneous coordinates transformation matrix $A_{hand}$ into said matrices $U(A_{hand})$ and $V(A_{hand})$, respectively; and joint rotation angle computing means for evaluating angles $\theta_i^{(k)}$ of rotation (k stands for positive integers to the maximum 16 for discriminating mutually between a plurality of angles $\theta_i$) of the joints on the basis of the numerical value matrix equation expressed by equation (3).

Still further, to achieve the above-mentioned objects, according to the present invention, there is provided a second manipulator simulation apparatus adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ representative of the position and the orientation of the tip of the manipulator looking at an absolute coordinate system is expressed by $$A_{hand} = \begin{bmatrix} C_{hand} & t_{hand} \\ \hline 0 & 1 \end{bmatrix} = \begin{bmatrix} n_x & s_x & a_x & p_x \\ n_y & s_y & a_y & p_y \\ n_z & s_z & a_z & p_z \\ 0 & 0 & 0 & 1 \end{bmatrix}$$

where $C_{hand}$ denotes an orientation, and $t_{hand}$ denotes a position, and the homogeneous coordinates transformation matrix $A_i$ representative of the position and the orientation of the (i+1)th coordinate system looking at the i-th coordinate system, of all the coordinate systems sequentially assigned from the rear end of the manipulator toward the top, is expressed by $$A_i = \begin{bmatrix} C_i & C_{z,i} \cdot t_i \\ \hline 0 & 1 \end{bmatrix}$$

where:

i=1, 2, ..., 6

$C_i = C_{z,i} \cdot C_{x,i}$ $$C_{z,i} = \begin{bmatrix} c_i & -s_i & 0 \\ s_i & c_i & 0 \\ 0 & 0 & 1 \end{bmatrix}$$

$$C_{x,i} = \begin{bmatrix} 1 & 0 & 0 \\ 0 & \lambda_i & -\mu_i \\ 0 & \mu_i & \lambda_i \end{bmatrix}$$

$c_i = \cos\theta_i$, $s_i = \sin\theta_i$ $\lambda_i = \cos\alpha_i$, $\mu_i = \sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix, said apparatus comprises:

storage means for storing a matrix equation expressed by equation (2) in which respective components of said homogeneous coordinates transformation matrix $A_{hand}$ are given as variables, $$U(A_{hand}) \cdot \xi \cdot (1 + x_1^2)(1 + x_2^2) = V(A_{hand}) \cdot \left[ \begin{array}{c} x_3 \cdot \rho \\ \rho \end{array} \right] \quad (2)$$

where $U(A_{hand})$ and $V(A_{hand})$ stand for matrices in which the respective components of said homogeneous coordinates transformation matrix $A_{hand}$ are given as variables, said matrices being produced by a numerical value substitution of respective components of the parameter $t_i$ into said matrices U and V, respectively, wherein said matrix equation expressed by equation (2) is obtained by a numerical value substitution of respective components of the parameter $t_i$ into a matrix equation (1) evaluated based on said homogeneous coordinates transformation matrix $A_{hand}$ and said homogeneous coordinates transformation matrix $A_i$, $$U \cdot \xi \cdot (1 + x_1^2)(1 + x_2^2) = V \cdot \left[ \begin{array}{c} x_3 \cdot \rho \\ \rho \end{array} \right] \quad (1)$$

where

U denotes 20×16 of real number matrix,
V denotes 20×18 of real number matrix, $\xi = [x_3\, s_4\, s_5,\, x_3\, s_4\, c_5,\, x_3\, c_4\, s_5,\, x_3\, c_4\, c_5,$ $\quad x_3\, s_4,\, x_3\, c_4,\, x_3\, s_5,\, x_3\, c_5,\, s_4\, s_5,\, s_4\, c_5,\, c_4\, s_5,\, c_4\, c_5,\, s_4,\, c_4,\, s_5,\, c_5]^T$, $\rho = [x_1^2\, x_2^2,\, x_1^2\, x_2,\, x_1^2,\, x_1\, x_2^2,\, x_1\, x_2,\, x_1,\, x_2^2,\, x_2,\, 1]^T$, and $X_i = \tan(\theta_i/2)$;

input means for inputting respective components of said homogeneous coordinates transformation matrix $A_{hand}$;

numerical value matrix equation derivation means for, by numerical value substitution of the respective components of said homogeneous coordinates transformation matrix $A_{hand}$ entered through said input means into the matrix equation expressed by equation (2), deriving a numerical value matrix equation expressed by equation (3), $$U_{num} \cdot \xi \cdot (1 + x_1^2)(1 + x_2^2) = V_{num} \cdot \left[ \begin{array}{c} x_3 \cdot \rho \\ \rho \end{array} \right] \quad (3)$$

where $U_{num}$ and $V_{num}$ stand for numerical value matrices produced by numerical substitution of the respective components of said homogeneous coordinates transformation matrix $A_{hand}$ into said matrices $U(A_{hand})$ and $V(A_{hand})$, respectively; and joint rotation angle computing means for evaluating angles $\theta_i^{(k)}$ of rotation (k stands for positive integers to the maximum 16 for discriminating mutually between a plurality of angles $\theta_i$) of the joints on the basis of the numerical value matrix equation expressed by equation (3).

Here, in the first manipulator simulation apparatus and the second manipulator simulation apparatus, it is preferable that said joint rotation angle computing means comprises:

means for evaluating equations, in which $\theta_4$ and $\theta_5$ are eliminated, on the basis of the numerical value matrix equation given by equation (3);

means for evaluating eigenvalue equations or generalized eigenvalue equations on the basis of the resultant equations in which $\theta_4$ and $\theta_5$ are eliminated; and means for evaluating said angles $\theta_i^{(k)}$ of rotation on the basis of the resultant eigenvalue equations or generalized eigenvalue equations.

Still further, to achieve the above-mentioned objects, according to the present invention, there is provided a third manipulator simulation apparatus adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ representative of the position and the orientation of the tip of the manipulator looking at an absolute coordinate system is expressed by $$A_{hand} = \left[ \begin{array}{c|c} C_{hand} & t_{hand} \\ \hline 0 & 1 \end{array} \right] = \left[ \begin{array}{ccc|c} n_x & s_x & a_x & p_x \\ n_y & s_y & a_y & p_y \\ n_z & s_z & a_z & p_z \\ \hline 0 & 0 & 0 & 1 \end{array} \right]$$

where $C_{hand}$ denotes an orientation, and $t_{hand}$ denotes a position, and the homogeneous coordinates transformation matrix $A_i$ representative of the position and the orientation of the (i+1)th coordinate system looking at the i-th coordinate system, of all the coordinate systems sequentially assigned from the rear end of the manipulator toward the top, is expressed by $$A_i = \left[ \begin{array}{c|c} C_i & C_{z,i} \cdot t_i \\ \hline 0 & 1 \end{array} \right]$$

where:

i = 1, 2, ..., 6

$C_i = C_{z,i} \cdot C_{x,i}$ $$C_{z,i} = \left[ \begin{array}{ccc} c_i & -s_i & 0 \\ s_i & c_i & 0 \\ 0 & 0 & 1 \end{array} \right]$$

$$C_{x,i} = \left[ \begin{array}{ccc} 1 & 0 & 0 \\ 0 & \lambda_i & -\mu_i \\ 0 & \mu_i & \lambda_i \end{array} \right]$$

$c_i = \cos\theta_i$, $s_i = \sin\theta_i$ $\lambda_i = \cos\alpha_i$, $\mu_i = \sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix, said apparatus comprises:

storage means for storing a matrix equation (4) evaluated based on said homogeneous coordinates transformation matrix $A_{hand}$ and said homogeneous coordinates transformation matrix $A_i$, $$U \cdot \xi \cdot (1 + x_4^2)(1 + x_5^2) = V \cdot \left[ \begin{array}{c} x_3 \cdot \rho \\ \rho \end{array} \right] \quad (4)$$

where
U denotes 20×16 of real number matrix,
V denotes 20×18 of real number matrix, $$\xi = [x_3 s_1 s_2, x_3 s_1 c_2, x_3 c_1 s_2, x_3 c_1 c_2, x_3 s_1, x_3 c_1,$$
$$x_3 s_2, x_3 c_2, s_1 s_2, s_1 c_2, c_1 s_2, c_1 c_2, s_1, c_1, s_2, c_2]^T$$

$\rho = [x_4^2 x_5^2, x_4^2 x_5, x_4^2, x_4 x_5^2, x_4 x_5, x_4, x_5^2, x_5, 1]^T$
$x_i = \tan(\theta_i/2)$, first input means for inputting respective components of the parameter $t_i$ in the form of numerical value;

parameter numerical value substitution means for, by a numerical value substitution of respective components of the parameter $t_i$ entered through said first input means into the matrix equation expressed by equation (4), deriving a matrix equation expressed by equation (5) in which respective components of said homogeneous coordinates transformation matrix $A_{hand}$ are given as variables, $$U(A_{hand}) \cdot \xi \cdot (1 + x_4^2)(1 + x_5^2) = V(A_{hand}) \cdot \left[ \begin{array}{c} x_3 \cdot \rho \\ \rho \end{array} \right] \quad (5)$$

where $U(A_{hand})$ and $V(A_{hand})$ stand for matrices in which the respective components of said homogeneous coordinates transformation matrix $A_{hand}$ are given as variables, said matrices being produced by numerical value substitution of respective components of the parameter $t_i$ into said matrices U and V, respectively;

second input means for inputting respective components of said homogeneous coordinates transformation matrix $A_{hand}$;

numerical value matrix equation derivation means for, by numerical value substitution of the respective components of said homogeneous coordinates transformation matrix $A_{hand}$ entered through said second input means into the matrix equation expressed by equation (5), deriving a numerical value matrix equation expressed by equation (6), $$U_{num} \cdot \xi \cdot (1 + x_4^2)(1 + x_5^2) = V_{num} \cdot \left[ \begin{array}{c} x_3 \cdot \rho \\ \rho \end{array} \right] \quad (6)$$

where $U_{num}$ and $V_{num}$ stand for numerical value matrices produced by numerical substitution of the respective components of said homogeneous coordinates transformation matrix $A_{hand}$ into said matrices $U(A_{hand})$ and $V(A_{hand})$, respectively; and joint rotation angle computing means for evaluating angles $\theta_i^{(k)}$ of rotation (k stands for positive integers to the maximum 16 for discriminating mutually between a plurality of angles $\theta_i$) of the joints on the basis of the numerical value matrix equation expressed by equation (6).

Still further, to achieve the above-mentioned objects, according to the present invention, there is provided a fourth manipulator simulation apparatus adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ representative of the position and the orientation of the tip of the manipulator looking at an absolute coordinate system is expressed by $$A_{hand} = \left[ \begin{array}{c|c} C_{hand} & t_{hand} \\ \hline 0 & 1 \end{array} \right] = \left[ \begin{array}{ccc|c} n_x & s_x & a_x & p_x \\ n_y & s_y & a_y & p_y \\ n_z & s_z & a_z & p_z \\ \hline 0 & 0 & 0 & 1 \end{array} \right]$$

where
$C_{hand}$ denotes an orientation, and
$t_{hand}$ denotes a position,
and the homogeneous coordinates transformation matrix $A_i$ representative of the position and the orientation of the (i+1)th coordinate system looking at the i-th coordinate system, of all the coordinate systems sequentially assigned from the rear end of the manipulator toward the top, is expressed by $$A_i = \left[ \begin{array}{c|c} C_i & C_{z,i} \cdot t_i \\ \hline 0 & 1 \end{array} \right]$$

where:
i=1, 2, . . . , 6
$C_i = C_{z,i} \cdot C_{x,i}$ $$C_{z,i} = \left[ \begin{array}{ccc} c_i & -s_i & 0 \\ s_i & c_i & 0 \\ 0 & 0 & 1 \end{array} \right]$$

$$C_{x,i} = \left[ \begin{array}{ccc} 1 & 0 & 0 \\ 0 & \lambda_i & -\mu_i \\ 0 & \mu_i & \lambda_i \end{array} \right]$$

$c_i = \cos\theta_i$, $s_i = \sin\theta_i$
$\lambda_i = \cos\alpha_i$, $\mu_i = \sin\alpha_i$ $\theta_i$ denotes an angle of rotation of i-th joint,
$\alpha_i$ denotes an angle of gradient of axis of rotation of i-th joint to an axis of rotation of i-1th joint,
$t_i$ denotes a three-dimensional parameter defining a configuration of i-th link, and the homogeneous coordinates transformation matrix $A_i$ may be a unit matrix, said apparatus comprises:
storage means for storing a matrix equation expressed by equation (5) in which respective components of said homogeneous coordinates transformation matrix $A_{hand}$ are given as variables, $$U(A_{hand}) \cdot \xi \cdot (1 + x_4^2)(1 + x_5^2) = V(A_{hand}) \cdot \left[ \begin{array}{c} x_3 \cdot \rho \\ \rho \end{array} \right] \quad (5)$$

where $U(A_{hand})$ and $V(A_{hand})$ stand for matrices in which the respective components of said homogeneous coordinates transformation matrix $A_{hand}$ are given as variables, said matrices being produced by a numerical value substitution of respective components of the parameter $t_i$ into said matrices U and V, respectively, wherein said matrix equation expressed by equation (5) is obtained by a numerical value substitution of respective components of the parameter $t_i$ into a matrix equation (4) evaluated based on said homogeneous coordinates transformation matrix $A_{hand}$ and said homogeneous coordinates transformation matrix $A_i$, $$U \cdot \xi \cdot (1 + x_4^2)(1 + x_5^2) = V \cdot \begin{bmatrix} x_3 \cdot \rho \\ \rho \end{bmatrix} \quad (4)$$

where

U denotes 20×16 of real number matrix,

V denotes 20×18 of real number matrix, $$\xi = [x_3 s_1 s_2, x_3 s_1 c_2, x_3 c_1 s_2, x_3 c_1 c_2, x_3 s_1, x_3 c_1, x_3 s_2,$$
$$x_3 c_2, s_1 s_2, s_1 c_2, c_1 s_2, c_1 c_2, s_1, c_1, s_2, c_2]^T$$

$\rho = [x_4^2 x_5^2, x_4^2 x_5, x_4^2, x_4 x_5^2, x_4 x_5, x_4, x_5^2, x_5, 1]^T$ $x_i = \tan(\theta_i/2)$, input means for inputting respective components of said homogeneous coordinates transformation matrix $A_{hand}$;

numerical value matrix equation derivation means for, by numerical value substitution of the respective components of said homogeneous coordinates transformation matrix $A_{hand}$ entered through said input means into the matrix equation expressed by equation (5), deriving a numerical value matrix equation expressed by equation (6), $$U_{num} \cdot \xi \cdot (1 + x_4^2)(1 + x_5^2) = V_{num} \cdot \begin{bmatrix} x_3 \cdot \rho \\ \rho \end{bmatrix} \quad (6)$$

where $U_{num}$ and $V_{num}$ stand for numerical value matrices produced by numerical substitution of the respective components of said homogeneous coordinates transformation matrix $A_{hand}$ into said matrices $U(A_{hand})$ and $V(A_{hand})$, respectively; and joint rotation angle computing means for evaluating angles $\theta_i^{(k)}$ of rotation (k stands for positive integers to the maximum 16 for discriminating mutually between a plurality of angles $\theta_i$) of the joints on the basis of the numerical value matrix equation expressed by equation (6).

Here, in the third manipulator simulation apparatus and the fourth manipulator simulation apparatus, it is preferable that said joint rotation angle computing means comprises:

means for evaluating equations, in which $\theta_1$ and $\theta_2$ are eliminated, on the basis of the numerical value matrix equation given by equation (6);

means for evaluating eigenvalue equations or generalized eigenvalue equations on the basis of the resultant equations in which $\theta_1$ and $\theta_2$ are eliminated; and means for evaluating said angles $\theta_i^{(k)}$ of rotation on the basis of the resultant eigenvalue equations or generalized eigenvalue equations.

DESCRIPTION OF THE PREFERRED EMBODIMENTS

Hereinafter, there will be described embodiments of the present invention.

Hereinafter, there will be dealt with the inverse kinematics of 6 degree of freedom of manipulator through the combination of rotary joints.

Figure 1:
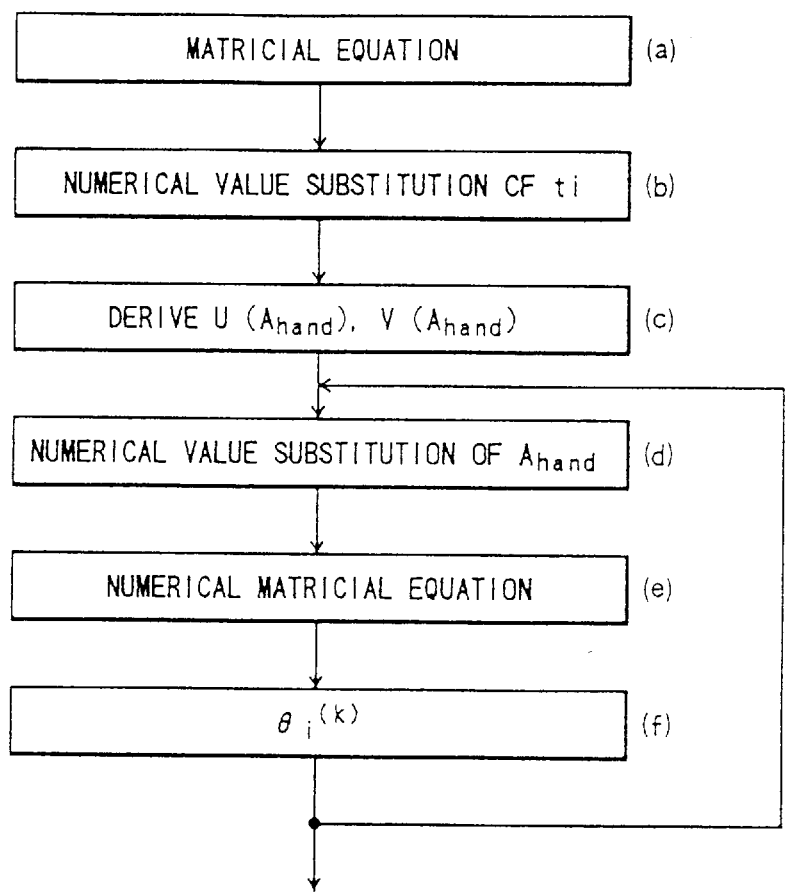
FIG. 1 is a flowchart useful for understanding the first embodiment of the first manipulator simulation method according to the present invention.

FIG. 1 is a flowchart useful for understanding an embodiment of the first manipulator simulation method according to the present invention. Hereinafter, this embodiment will be referred to as "the first embodiment".

First, in step (a), a matricial equation in the above-mentioned equation (1) is evaluated.

Figure 9:
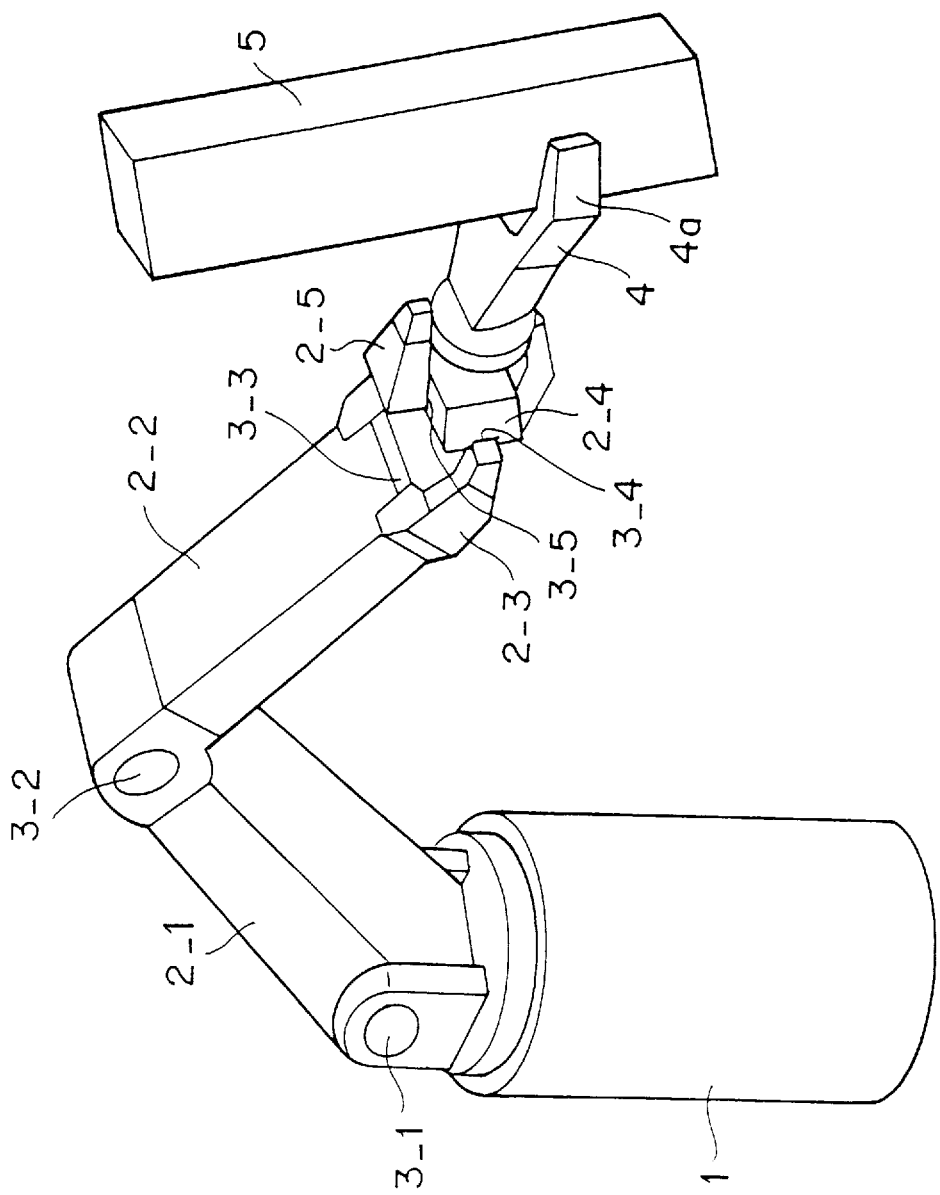
FIG. 9 is a typical illustration of an example of a manipulator comprising a plurality of arms and joints for coupling the arms to each other.

A homogeneous coordinates transformation matrix $A_{hand}$ representative of the position and the orientation of the tip of the manipulator looking at an absolute coordinate system, for example, a coordinate system assigned to the substrate or the base 1 shown in FIG. 9, is expressed by $$A_{hand} = \begin{bmatrix} C_{hand} & t_{hand} \\ 0 & 1 \end{bmatrix} = \begin{bmatrix} n_x & s_x & a_x & p_x \\ n_y & s_y & a_y & p_y \\ n_z & s_z & a_z & p_z \\ 0 & 0 & 0 & 1 \end{bmatrix} \in R(4 \times 4) \quad (7)$$

where $C_{hand}$ denotes an orientation, and $t_{hand}$ denotes a position.

The homogeneous coordinates transformation matrix $A_i$ representative of the position and the orientation of the (i+1)th coordinate system looking at the i-th coordinate system, of all the coordinate systems sequentially assigned from the rear end of the manipulator toward the top, and the inverse matrix $A_i^{-1}$ are respectively expressed by $$A_i = \begin{bmatrix} C_i & C_{z,i} \cdot t_i \\ 0 & 1 \end{bmatrix} \in R(4 \times 4) \quad (8)$$

$$A_i^{-1} = \begin{bmatrix} C_i^T & -C_{x,i}^T \cdot t_i \\ 0 & 1 \end{bmatrix} \in R(4 \times 4) \quad (9)$$

$i = 1, 2, \ldots, 6$ where $\in R(4 \times 4)$ implies that the matrix set forth in the left side of this symbol is a real number matrix of 4 columns.

Here, the rotary portions $C_i$, $C_{z,i}$ and $C_{x,i}$ are defined as follows:

$C_i = C_{z,i} \cdot C_{x,i}$ $$C_{z,i} = \begin{bmatrix} c_i & -s_i & 0 \\ s_i & c_i & 0 \\ 0 & 0 & 1 \end{bmatrix}$$

-continued $$C_{x,i} = \begin{bmatrix} 1 & 0 & 0 \\ 0 & \lambda_i & -\mu_i \\ 0 & \mu_i & \lambda_i \end{bmatrix}$$

$c_i = \cos\theta_i$, $s_i = \sin\theta_i$,
$\lambda_i = \cos\alpha_i$, $\mu_i = \sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link. Specifically, here, a Demerit-Hartenberg (D-H) parameter as set forth below is adopted.

$$t_i = [a_i \, 0 \, d_i] \quad (10)$$

$i = 1, 2, \ldots, 6$

Here, while there is dealt with a manipulator having a degree of freedom 6, in a case where the number of degree of freedom is less than 6, anyone or more of the above-mentioned $A_i$ (i=1, 2, ..., 6) may be regarded as a unit matrix by the corresponding reduced number. Thus, it is possible for also a manipulator having the number of degree of freedom less than 6 to apply this argument as it is.

Next, the D-H parameter will be explained in accordance with the definition set forth in the publication "ROBOTICS for mechanical systems" by Shigeki Tohyama, published by Sohgoh Densi Publishing Company. The D-H parameter is well known, and thus here the definition thereof will be simply explained.

Figure 2:
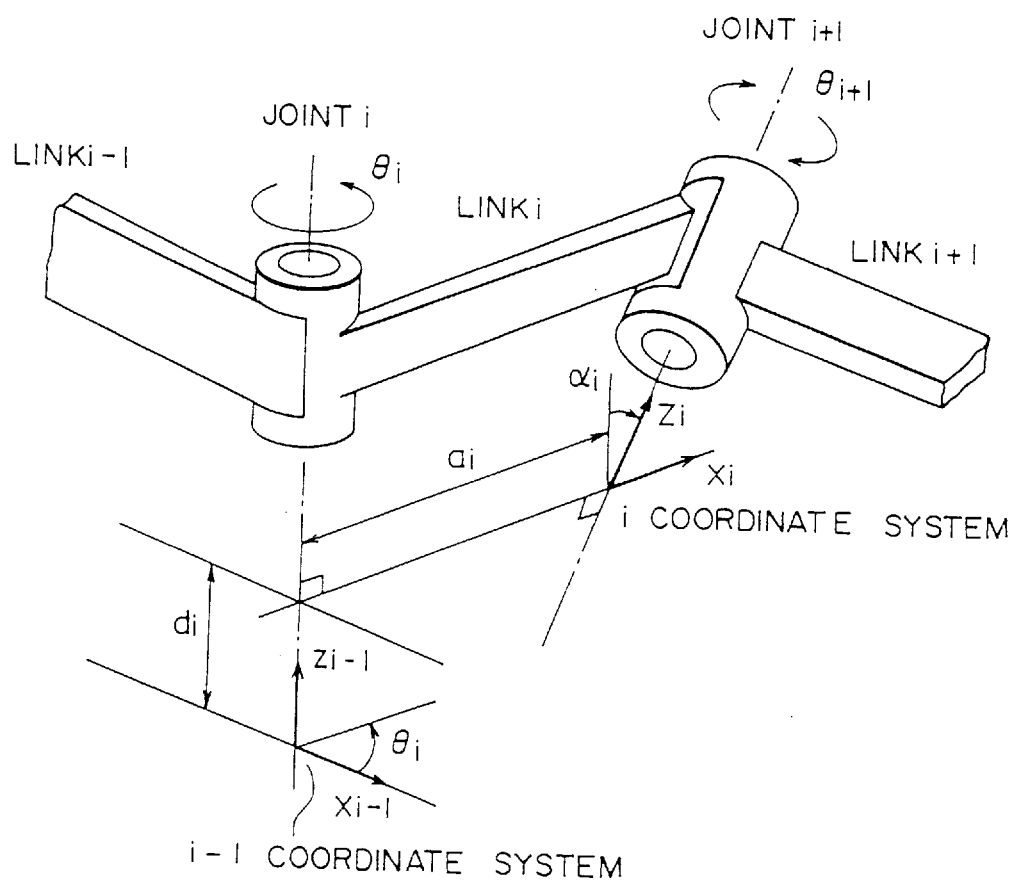
FIG. 2 is a view partially illustrating links and joints, useful understanding a D-H parameter.

FIG. 2 is a view partially illustrating links and joints, useful understanding the D-H parameter.

First, a base coordinate system ($\text{right}_{hand}$ system) is set up. The $z_0$-axis is given so as to direct to a direction of the arm shoulder portion in a direction of rotation of joint 1. The $x_0$-axis and $y_0$-axis are given on a suitable basis.

Next, with respect to the respective links i (i=1, 2, ..., 6), the coordinate systems are set up in accordance with the following items (1) to (4).

(1) Set up the $z_i$-axis in a direction of motion of joint i+1.

(2) Determine as the origin of the i-th coordinate system the intersection point of the $z_i$-axis and the $z_{i-1}$-axis or the intersection point of the $z_i$-axis and the common normal of the $z_i$-axis and the $z_{i-1}$-axis. When the $z_i$-axis and the $z_{i-1}$-axis are parallel to each other, the origin of the i-th coordinate system is determined in such a manner that the link parameter $d_i$, which will be described later, becomes 0.

(3) Determine $x_i$ set forth below, when $z_{i-1}$ and $z_i$ are defined as vectors directed toward the directions of the $z_{i-1}$-axis and the $z_i$-axis, respectively, $$x_i = \pm(z_{i-1} \times z_i)/\|z_{i-1} \times z_i\|$$

or set up the $x_i$-axis in the direction of the common normal of the $z_i$-axis and the $z_{i-1}$-axis.

(4) Set up the $y_i$-axis to form the right hand system.

When the coordinate system is set up in accordance with the above-mentioned manner, a distance between the origin of the i-1th coordinate system and the intersection point of the $z_{i-1}$-axis and the $x_i$-axis, extending in the direction of the $z_{i-1}$-axis, is defined as a link parameter $d_i$. Further, a distance between the intersection point of the $z_{i-1}$-axis and the $x_i$-axis and the origin of the i-th coordinate system, in which the negative direction of the $z_i$-axis is of positive, is defined as a link parameter $a_i$.

Here, as the parameter $t_i$, there is adopted the equation (10) as noted above, that is, $$t_i = [a_i \, 0 \, d_i] \quad (10)$$

$i = 1, 2, \ldots, 6$

Particularly, it is noted that the above-mentioned items $\theta_i$ and $\alpha_i$ are also the link parameters constituting the D-H parameter. The link parameters $\theta_i$ denotes an angle of rotation on the $z_{i-1}$-axis from the $x_{i-1}$-axis to the $x_i$-axis. The link parameter $\alpha_i$ denotes an angle of rotation on the $x_i$-axis from the $z_{i-1}$-axis to the $z_i$-axis.

Returning to FIG. 1, there will be continued the explanation as to the method of deriving the matricial equation (1) in step (a).

The forward kinematics equation of the manipulator is given by equation (11).

$$A_{hand} = A_1 \cdot A_2 \cdot A_3 \cdot A_4 \cdot A_5 \cdot A_6 \quad (11)$$

The forward kinematics implies that when information as to angles of rotation of the respective joints for coupling link-to-link constituting a manipulator with each other is provided, a position and an orientation of the tip of the manipulator is determined.

Here, 14 fundamental equations (2 scalar equations and 4 vector equations) are derived in accordance with the above equation (11), and then further 6 fundamental equations are derived using the resultant 14 fundamental equations. The combination of the total 20 fundamental equations produces the matricial equation given by the above equation (1).

(Derivation of 14 fundamental equations)

The above equation (11) is rewritten as follows.

$$A_3 \cdot A_4 \cdot A_5 = A_2^{-1} \cdot A_1^{-1} \cdot A_{hand} \cdot A_6^{-1} \quad (12)$$

First, the following fundamental vector equations are derived based on the equation (12). Incidentally, a quantity derived from the left side member of the equation (12) is expressed by the suffix A, and a quantity derived from the right side member of the equation (12) is expressed by the suffix B.

$$z_A = A_3 A_4 A_5 e_3 = A_2^{-1} A_1^{-1} A_{hand} A_6^{-1} e_3 = z_B \quad (13)$$

$$p_A = A_3 A_4 A_5 e_4 = A_2^{-1} A_1^{-1} A_{hand} A_6^{-1} e_4 = p_B \quad (14)$$

where $e_i$ (i=1 ... 4) denote unit vectors, and represent:

$e_1 = [1 0 0 0]^T$ $e_2 = [0 1 0 0]^T$ $e_3 = [0 0 1 0]^T$ $e_4 = [0 0 0 1]^T$

In equations (13) and (14), the fourth component becomes an obvious equation like 1=1, 0=0. Thus, hereinafter, the fourth component will be neglected, and it is assumed that equations (13) and (14) denote each a three-dimensional vector comprising the first component, the second component and the third component.

Taking the internal product, the external product and the vector sum based on p and z of equations (13) and (14) may derive the following equations.

$$(p^T \cdot p)_A = (p^T \cdot p)_B \quad (15)$$

$$(p^T \cdot z)_A = (p^T \cdot z)_B \quad (16)$$

$(p^T \times z)_A = (p^T \times z)_B$ (17)

$[p \times (p \times z) + (p^T \cdot z)p]_A = [p \times (p \times z) + (p^T \cdot z)p]_B$ (18)

Equation (18) may be rewritten as follows.

$[2(p^T \cdot z)p - (p^T \cdot p)z]_A = [2(p^T \cdot z)p - (p^T \cdot p)z]_B$ (19)

As a result of the precise analysis using the mathematical expression processing, it is understood that equations (13) to (18) or (19) are of linear with respect to $\cos\theta_i$, $\sin\theta_i$. On the other hand, other combinations each comprising p and z lack a linearity.

To apply the mathematical expression processing, equations (13) to (18) or (19) are resolved beforehand using equations (8) and (9) as follows.

(1) $z_A = z_B$ (20)
$z_A = C_{z,3}C_{x,3}C_4C_5 e_3$
$= C_2{}^T C_1{}^T C_{hand} C_6{}^T e_3 = z_B$ (2) $p_A = p_B$ (21)
$p_A = C_{z,3}(C_{x,3}C_4C_{z,5} \cdot t_5 + C_{x,3}C_{z,4} \cdot t_4 + t_3)$
$= -C_2{}^T(C_1 C_{hand} C_6{}^T \cdot t_6 - C_1{}^T \cdot t_{hand} + C_{x,1}{}^T \cdot t_1) - C_{x,2}{}^T \cdot t_2$
$= p_B$ (3) $(p^T \cdot p)_A = (p^T \cdot p)_B$ (22)
$(p^T \cdot p)_A = t_3{}^T \cdot t_3 + 2t_3{}^T C_{x,3} C_{z,4} \cdot t_4 +$
$2t_3{}^T C_{x,3} C_4 C_{z,5} \cdot t_5 + t_4{}^T \cdot t_4 +$
$2t_4{}^T C_{x,4} C_{z,5} \cdot t_5 + t_5{}^T \cdot t_5$
$= t_2{}^T \cdot t_2 + 2t_2{}^T C_{z,2}{}^T C_{x,1}{}^T \cdot t_1 -$
$2t_2{}^T C_{z,2}{}^T C_1{}^T \cdot t_{hand} + 2t_2{}^T C_{z,2}{}^T C_1{}^T \cdot C_{hand} C_{x,6}{}^T \cdot t_6 + t_1{}^T \cdot t_1 - 2t_1{}^T C_{z,1}{}^T \cdot t_{hand} + 2t_1{}^T C_{z,1}{}^T C_{hand} C_{x,6}{}^T \cdot t_6 + t_{hand}{}^T \cdot t_{hand} - 2t_{hand}{}^T C_{hand} C_{x,6}{}^T \cdot t_6 + t_6{}^T \cdot t_6$
$= (p^T \cdot p)_B$ (4) $(p^T \cdot z)_A = (p^T \cdot z)_B$ (23)
$(p^T \cdot z)_A = (z^T \cdot p)_A$
$= e_3{}^T \cdot C_{x,5}{}^T \cdot t_5 + e_3{}^T C_5{}^T C_{x,4}{}^T \cdot t_4 +$
$e_3{}^T \cdot C_5{}^T C_4{}^T C_{x,3}{}^T \cdot t_3$
$= -e_3{}^T t_6 + e_3{}^T C_6 C_{hand}{}^T \cdot t_{hand} -$
$e_3{}^T C_6 C_{hand}{}^T C_{z,1} \cdot t_1 -$
$e_3{}^T C_6 C_{hand}{}^T C_1 C_{z,2} \cdot t_2$
$= (z^T \cdot p)_B$
$= (p^T \cdot z)_B$ (5) $(p^T \times z)_A = (p^T \times z)_B$ (24)
$(p^T \times z)_A = C_{z,3} C_{x,3} C_4 C_{z,5}(t_5 \times C_{x,5} e_3) +$
$C_{z,3} C_{x,3} C_{z,4}(t_4 \times C_{x,4} C_5 e_3) +$
$C_{z,3}(t_3 \times C_{x,3} C_4 C_5 e_3)$
$= -C_2{}^T C_1{}^T C_{hand} {}^T C_{x,6}{}^T (t_6 \times C_{z,6}{}^T e_3) +$
$C_2{}^T C_1{}^T(t_{hand} \times C_{hand} C_6{}^T e_3) -$
$C_2{}^T C_{x,1}{}^T (t_1 \times C_{z,1}{}^T C_{hand} C_6{}^T e_3) -$
$C_{x,2}{}^T (t_2 \times C_{z,2}{}^T C_1{}^T C_{hand} C_6{}^T e_3)$
$= (p^T \times z)_B$ (6) $[2(p^T \cdot z)p - (p^T \cdot p)z]_A$ (25)
$= [2(p^T \cdot z)p - (p^T \cdot p)z]_B$
$[2(p^T \cdot z)p - (p^T \cdot p)z]_A$
$= 2(p^T \cdot z)_A C_{z,3}(C_{x,3}C_4 C_{z,5} \cdot t_5 + C_{x,3} C_{z,4} \cdot t_4 + t_3) - (p^T \cdot p)_A C_{z,3} C_{x,3} C_4 C_5 e_3$
$= 2(p^T \cdot z)_B C_{x,2}{}^T (C_{z,2}{}^T C_1{}^T C_{hand} C_6{}^T \cdot t_6 - C_{z,2}{}^T C_1{}^T \cdot t_{hand} + C_{z,2}{}^T C_{x,1}{}^T \cdot t_1 + t_2) - (p^T \cdot p)_B C_2{}^T C_1{}^T C_{hand} C_6{}^T e_3$
$= [2(p^T \cdot z)p - (p^T \cdot p)z]_B$ (Property of the fundamental equations)

Fundamental equations (20) to (25) have the following characteristics.

(a) The respective elements of the matrix $A_{hand}$ representative of the position an orientation of the tip of the manipulator appears only at the right side member.

(b) All the equations do not depend on $\theta_6$.

Because, in equations (20) to (25) $\theta_6$ appears in the form of $C_6{}^T e_3 = C_{x,6}{}^T C_{z,6}{}^T e_3$, but $C_{z,6}{}^T e_3 = [001]^T$.

(c) $z_3$, $p_3$, $p^T \cdot z$, $p^T \cdot p$, $(p^T \times z)_3$, $[2(p^T \cdot z)p - (p^T \cdot p)z]_3$ does not depend on $\theta_3$.

Here, for example, $z_3$ and $p_3$ stand for the third elements of z and p, respectively. This is the similar as to the matter of others.

Because, the items $(p^T \cdot z)$ and $(p^T \cdot p)$ do not depend on $C_{z,3}$. With respect to $z_3$, $p_3$, $(p^T \times z)_3$, $[2(p^T \cdot z)p - (p^T \cdot p)z]_3$, $\theta_3$ always appears in the form of $e_3{}^T C_{z,3}$, but $e_3{}^T C_{z,3} = e_3{}^T$.

(d) $z_1$, $z_2$, $p_1$, $p_2$, $(p^T \times z)_1$, $(p^{T \times z})_2$, $[2(p^T \cdot z)p - (p^T \cdot p)z]_1$, $[2(p^T \cdot z)p - (p^T \cdot p)z]_2$ is linear with respect to $\tan(\theta_3/2)$.

Because, when $x_i = \tan(\theta_i/2)$, the following equations consist:

$\cos\theta_i = (1-x_i^2)/(1+x_i^2)$ $\sin\theta_i = 2x_i/(1+x_i^2)$ $X_3{}^- \cdot C_{z,3} = X_3{}^+$ $X_i{}^- = \begin{bmatrix} -x_i & 1 & 0 \\ 1 & x_i & 0 \\ 0 & 0 & 1 \end{bmatrix}, X_i{}^+ = \begin{bmatrix} x_i & 1 & 0 \\ 1 & -x_i & 0 \\ 0 & 0 & 1 \end{bmatrix}$ (26)

The above results can be obtained by means of multiplying, in z, p, $p^T x z$, $2(p^T \cdot z)p - (p^T \cdot p)z$, by $X_3{}^-$ from the left.

(e) $\theta_1$, $\theta_2$, $\theta_4$, $\theta_5$ always appear in the form of a linearity with respect to $\cos\theta_i$, $\sin\theta_i$ (i=1, 2, 4, 5), but the items of $(\cos\theta_i)^2$, $(\sin\theta_i)^2$, $\cos\theta_i \cdot \sin\theta_i$ do not appear.

Because, in z, p, $p^T\cdot p$, $p^T\cdot z$, $p^T\times z$, there simply appears $C_{z,i}$ once for each item. Further, with respect to $2(p^T\cdot z)p-(p^T\cdot p)z$, it is understood that this is of linear through such a process that the values of p, z, $p^T\cdot z$, $p^T\cdot p$ are substituted and arranged, taking account of $(\cos\theta_i)^2+(\sin\theta_i)^2=1$, $(\cos\alpha_i)^2+(\sin\alpha_i)^2=1$, using a mathematical expression processing.

(Matrix form of fundamental equations)

The fundamental equations of equations (20) to (25) can be expressed in the matrix form as set forth below.

$$U'\cdot\left[\frac{x_3\cdot\xi'}{\xi'}\right]\cdot(1+x_1^2)(1+x_2^2)=V'\cdot\left[\frac{x_3\cdot\rho}{\rho}\right] \quad (27)$$

U', V'∈R(14×18)

ξ', ρ∈$C^9$ (∈$C^9$ indicates that the symbol of the left is nine-dimensional complex vector)

$\xi'=[s_4\cdot s_5, s_4\cdot c_5, c_4\cdot s_5, c_4\cdot c_5, s_4, c_4, s_5, c_5, 1]^T$ $\rho=[x_1^2x_2^2, x_1^2x_2, x_1^2, x_1x_2^2, x_1x_2, x_1, x_2^2, x_2, 1]^T$ The components of U' and V' can be obtained through such a process that equations (20) to (25) are carefully subjected to a mathematical expression processing; $(\cos\theta_i)^2+(\sin\theta_i)^2=1$ (i=4, 5), $(\cos\alpha_i)^2+(\sin\alpha_i)^2+1$ (i=1, ..., 6), $\cos\theta_i=(1-x_i^2)/(1+x_i^2)$, $\sin\theta_i=2x_i/(1+x_i^2)$ (i=1, 2, 3) are substituted; and in the resultant algebraic equations the coefficients for the respective items of ξ' and ρ are evaluated.

Each component of U' and V' is a polynomial of several variables in which the components of parameters $t_i$ and $A_{hand}$ are given in the form of variables.

(Addition of fundamental equations)

With respect to $z_3$, $p_3$, $p^T\cdot z$, $p^T\cdot p$, $(p^T\times z)_3$, $[2(p^T\cdot z)p-(p^T\cdot p)z]_3$, they do not depend on $\theta_3$. Hence, it is possible to derive 6 equations as set forth below by means of being multiplied by $x_3=\tan(\theta_3/2)$ and taking the linear sum.

$$[x_3z_3+p_3]_A=[x_3z_3+p_3]_B \quad (28)$$

$$[x_3p_3+z_3]_A=[x_3p_3+z_3]_B \quad (29)$$

$$[x_3p^T\cdot p+p^T\cdot z]_A=[x_3p^T\cdot p+p^T\cdot z]_B \quad (30)$$

$$[x_3p^T\cdot z+p^T\cdot p]_A=[x_3p^T\cdot z+p^T\cdot p]_B \quad (31)$$

$$[x_3(p^T\times z)_3+z_3]_A=[x_3(p^T\times z)_3+z_3]_B \quad (32)$$

$$[x_3\{2(p^T\cdot z)p-(p^T\cdot p)z\}_3]+p_3]_A = \quad (33)$$
$$[x_3\{2(p^T\cdot z)p-(p^T\cdot p)z\}_3]+p_3]_B$$

When equations (28) to (33) are arranged in a similar fashion to that of equation (27), in which a part of the left side member is transferred to the right side member to be rearranged together with equation (27), there is obtained a matrix equation expressed by the above-mentioned equation (1).

$$U\cdot\xi\cdot(1+x_1^2)(1+x_2^2)=V\cdot\left[\frac{x_3\cdot\rho}{\rho}\right] \quad (1)$$

$U\in R(20\times 16)$, $V\in R(20\times 18)$, $\xi\in C^{16}$, $\rho\in C^9$ $\xi = [x_3s_4s_5, x_3s_4c_5, x_3c_4s_5, x_3c_4c_5, x_3s_4, x_3c_4, x_3s_5,$
$x_3c_5, s_4s_5, s_4c_5, c_4s_5, c_4c_5, s_4, c_4, s_5, c_5]^T$ -continued $$\rho = [x_1^2x_2^2, x_1^2x_2, x_1^2, x_1x_2^2, x_1x_2, x_1, x_2^2, x_2, 1]^T$$

Incidentally, in the above case, there is adopted as parameter $t_i$ the above-mentioned equation (10), that is, the D-H parameter as set forth below.

$$t_i=[a_i 0 d_i]^T \quad (10)$$

However, it is acceptable that instead of the above-mentioned equation (10), there is adopted as parameter $t_i$ a so-called modification D-H parameter as set forth below.

$$t_i=[\xi_i\eta_i\zeta_i+\gamma_i]^T \quad (28)$$

In the D-H parameter, as mentioned above, a length of the common normal of the axes of the adjacent two joints is defined as the link parameter $a_i$. On the other hand, according to the modification D-H parameter, instead of the link parameter $a_i$, there are introduced a vector $D_i=(\xi_i, \eta_i, \zeta_i)$ which is perpendicular to only an axis in one direction, and an arbitrary length of parameter $\gamma_i$ along the axis $z_{i-1}$ of rotation instead of the link parameter $d_i$ representative of a distance between link-to-link (cf. "ROBOTICS for mechanical systems" by Shigeki Tohyama, published by Sohgoh Densi Publishing Company). While the D-H parameter uses the common normal of the axes of two joints, it is possible according to the modification D-H parameter to set up the coordinate system to a desired place, since the parameter $\gamma_i$ can be optionally set up.

An adoption of the parameter of equation (28) causes sensitivity to the variation of parameters to be smooth by the corresponding increment of the parameters of the coordinate system representative of the mechanical system, thereby being easy to perform the calibration of the mechanical parameters.

Next, there will be explained step (b) et seqq. in FIG. 1 in connection with the first embodiment.

It is sufficient for step (a) to be carried out once only beforehand. Hereafter, in step (b), matrix equations suitable for individual manipulators are formed.

In case of a system in which there is no existence of a manipulator in the form of the actual hardware, for example, a computer graphics, it is acceptable to adopt as the above-mentioned parameter $t_i$ the D-H parameter (equation (10)) and the modification D-H parameter (equation (28)) as well. On the other hand, in case of a system in which there is existence of a manipulator in the form of the actual hardware, or in a case where it may be presumed to constitute a manipulator in the form of the actual hardware even if there is not yet existence of the manipulator, it is preferable to adopt as parameter $t_i$ the modification D-H parameter (equation (28)).

When the D-H parameter (equation (10)) is adopted as the above-mentioned parameter $t_i$, the specific values of the respective components $a_i$, $d_i$(i=1, 2, ..., 6) of the parameter $t_i$ are substituted into the above-mentioned equation (1).

This is the similar as to the matter of an adoption of the modification D-H parameter (equation (28)) as the parameter $t_i$. In this case, first, the calibration of the modification D-H parameter is performed, and then the numerical values of the respective components ($\xi_i$, $\eta_i$, and $\zeta_i+\gamma_i$) of the parameter $t_i$, which are the resultant values of the calibration, are substituted into the above-mentioned equation (1). When the manipulator is constituted in the form of the actual hardware, it will be out of the ideal manipulator owing to the looseness and errors in size. In view of this matter, the numerical values suitable for the manipulator, which is arranged indeed, are evaluated and substituted.

The calibration itself is not the subject here, and thus the explanation will be omitted (In detail, refer to the aforementioned Shigeki "ROBOTICS for mechanical systems" by Shigeki Tohyama).

In this manner, the numerical substitution of the respective components of the parameter $t_i$ into the matrix equation expressed by equation (1) makes it possible to derive the matrix equation expressed by the above-mentioned equation (2) in which the respective components of $A_{hand}$ are given as variables, that is, the equation as set forth below (step (c) in FIG. 1).

$$U(A_{hand}) \cdot \xi \cdot (1 + x_1^2)(1 + x_2^2) = V(A_{hand}) \cdot \begin{bmatrix} x_3 \cdot \rho \\ \rho \end{bmatrix} \quad (2)$$

$U \in R(20 \times 16), V \in R(20 \times 18), \xi \in C^{16}, \rho \in C^9$ $\xi = [x_3s_4s_5, x_3s_4c_5, x_3c_4s_5, x_3c_4c_5, x_3s_4, x_3c_4, x_3s_5,$
$x_3c_5, s_4s_5, s_4c_5, c_4s_5, c_4c_5, s_4, c_4, s_5, c_5]^T$ $\rho = [x_1^2x_2^2, x_1^2x_2, x_1^2, x_1x_2^2, x_1x_2, x_1, x_2^2, x_2, 1]^T$ The matrix equations using the numerical processing terminate at equation (2), that is, step (c) in FIG. 1, and thereafter the whole processes deal with the numerical matrix.

That is, a numerical matrix equation with the numerical matrices $U_{num}$, $V_{num}$ is evaluated (step (e) in FIG. 1) through a numerical substitution (step (d) in FIG. 1) of the respective components of $A_{hand}$ representative of the position and the orientation of the tip of the manipulator into equation (2), and angles $\theta_i^{(k)}$ of rotation (k stands for positive integers to the maximum 16 for discriminating mutually between a plurality of angles $\theta_i$) of the respective joints i are evaluated on the basis of the numerical matrix equation (step (f) in FIG. 1). This numerical matrix equation is expressed by the above-mentioned equation (3), that is, $$U_{num} \cdot \xi \cdot (1 + x_1^2)(1 + x_2^2) = V_{num} \cdot \begin{bmatrix} x_3 \cdot \rho \\ \rho \end{bmatrix} \quad (3)$$

$U \in R(20 \times 16), V \in R(20 \times 18), \xi \in C^{16}, \rho \in C^9$ $\xi = [x_3s_4s_5, x_3s_4c_5, x_3c_4s_5, x_3c_4c_5, x_3s_4, x_3c_4, x_3s_5,$
$x_3c_5, s_4s_5, s_4c_5, c_4s_5, c_4c_5, s_4, c_4, s_5, c_5]^T$ $\rho = [x_1^2x_2^2, x_1^2x_2, x_1^2, x_1x_2^2, x_1x_2, x_1, x_2^2, x_2, 1]^T$ Repetition of step (d) to step (f) makes it possible to perform various simulations on the manipulator model.

Next, there will be explained details of a numerical solution of $\theta_i^{(k)}$, that is, step (f) in FIG. 1 on the basis of the numerical matrix equation given by equation (3).

Figure 3:
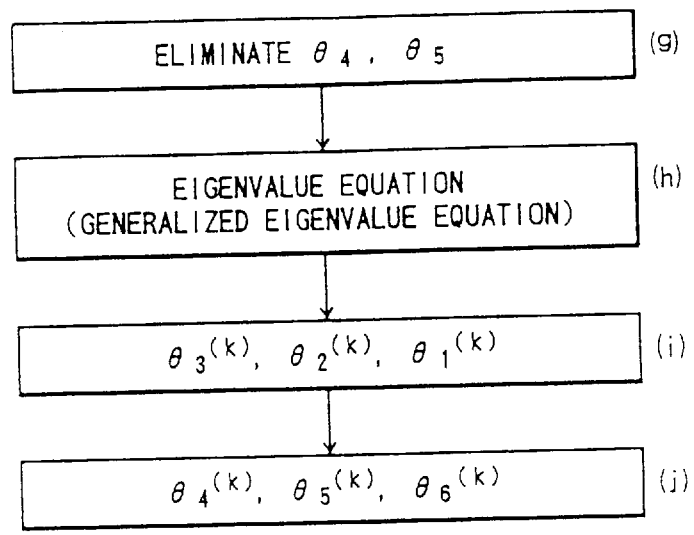
FIG. 3 is a detailed flowchart of step (f) of FIG. 1.

FIG. 3 is a detailed flowchart of step (f) in FIG. 1.

While some numerical solutions will be explained hereinafter, all the numerical solutions comply with step (g) to step (j) in FIG. 3. That is, in any solutions which will be explained hereinafter, to determine $\theta_i^{(k)}$, first, equations, in which $\theta_4$ and $\theta_5$ are eliminated, are evaluated on the basis of the numerical matrix equation given by equation (3) (step (g)). Next, eigenvalue equations or generalized eigenvalue equations are evaluated on the basis of the resultant equations in which $\theta_4$ and $\theta_5$ are eliminated (step(h)). Thereafter, $\theta_3^{(k)}$, $\theta_2^{(k)}$, $\theta_1^{(k)}$ are evaluated on the basis of the resultant eigenvalue equations or generalized eigenvalue equations (step (i)). Then, further, $\theta_4^{(k)}$, $\theta_5^{(k)}$, $\theta_6^{(k)}$ are evaluated (step (j)).

Hereinafter, there will be explained several numerical solutions according to the flowchart of FIG. 3.

(Numerical solution 1)

To erase $\theta_4$ and $\theta_5$ from the matricial equation given by equation (3), it is multiplied by 20×20 of real matrix W from the left of the equation. The respective components of the real matrix W are produced on a random basis. When the followings are given, $WU_{num} \equiv U_{ran} = [U_{16ran}, U_{4ran}]^T, U_{16ran} \in R (16 \times 16),$ $U_{4ran} \in R (4 \times 16), WV_{num} \equiv V_{ran} = [V_{16ran}, V_{4ran}]^T,$ $V_{16ran} \in R (16 \times 18), V_{4ran} \in R (4 \times 18), |det (U_{16ran})| > \epsilon$ ($\epsilon$: infinitesimal constant) is to be satisfied.

If $det(U_{16ran}) \approx 0$, the components of the real matrix W is to be reset.

At that time, equation (3) is expressed as follows:

$$\begin{bmatrix} U_{16ran} \\ U_{4ran} \end{bmatrix} \cdot \xi \cdot (1 + x_1^2)(1 + x_2^2) = \begin{bmatrix} V_{16ran} \\ V_{4ran} \end{bmatrix} \begin{bmatrix} x_3 \cdot \rho \\ \rho \end{bmatrix} \quad (29)$$

Hence, $$\xi \cdot (1 + x_1^2)(1 + x_2^2) = U_{16ran}^{-1} \cdot V_{16ran} \begin{bmatrix} x_3 \cdot \rho \\ \rho \end{bmatrix} \quad (30)$$

This is substituted into the remaining four equations of equation (29), so that $\theta_4$ and $\theta_5$ are eliminated. Thus, the following equation is formed.

$$U_{4ran} \cdot U_{16ran}^{-1} \cdot V_{16ran} \begin{bmatrix} x_3 \cdot \rho \\ \rho \end{bmatrix} = V_{4ran} \cdot \begin{bmatrix} x_3 \cdot \rho \\ \rho \end{bmatrix} \quad (31)$$

(Derivation of eigenvalue equation (generalized eigenvalue equation))

When the following equation is given, $V_{16ran} = [{}^xV_{16ran}, {}^1V_{16ran}],$ $V_{4ran} = [{}^xV_{4ran}, {}^1V_{4ran}],$ ${}^xV_{16ran}, {}^1V_{16ran} \in R(16 \times 9),$ ${}^xV_{4ran}, {}^1V_{4ran} \in R(4 \times 9)$ the above equation (31) is expressed by $[U_{4ran}U_{16ran}^{-1} \, {}^1V_{16ran} - {}^1V_{4ran}]\rho +$ \hfill (32)

$\qquad x_3[U_{4ran}U_{16ran}^{-1} \, {}^xV_{16ran} - {}^xV_{4ran}]\rho = 0$

When both the side members of equation (32) are multiplied by $x_1 x_2$, $x_1$, $x_2$, further 12 equations are formed, so that total 16 equations are derived. These are expressed by:

$G \cdot \rho + x_3 H \cdot \rho = 0$ \hfill (33)

$G, H \in R(16 \times 16)$
$\rho \in C^{16}$ $x_3 \epsilon C$ $$G = \begin{bmatrix} abc0 & def0 & ghj0 & 0000 \\ 0abc & 0def & 0ghj & 0000 \\ 0000 & abc0 & def0 & ghj0 \\ 0000 & 0abc & 0def & 0ghj \end{bmatrix} \quad (34)$$

$$H = \begin{bmatrix} klm0 & npq0 & rst0 & 0000 \\ 0klm & 0npq & 0rst & 0000 \\ 0000 & klm0 & npq0 & rst0 \\ 0000 & 0klm & 0npq & 0rst \end{bmatrix} \quad (35)$$

$$\rho = [x_1{}^3 x_2{}^3, x_1{}^3 x_2{}^2, x_1{}^3 x_2, x_1{}^3, x_1{}^2 x_2{}^3, x_1{}^2 x_2{}^2, x_1{}^2 x_2,$$
$$x_1{}^2, x_1 x_2{}^3, x_1 x_2{}^2, x_1 x_2, x_1, x_2{}^3, x_2{}^2, x_2, 1]^T$$

where a, . . . , t are expressed as follows:

$$U_{4ran} U_{16ran}{}^{-1} {}^1 V_{16ran}{}^{-1} V_{4ran} = [abcdefghj]$$

$$U_{4ran} U_{16ran}{}^{-1} {}^x V_{16ran}{}^{-x} V_{4ran} = [klmnpqrst]$$

a, b, c, d, e, f, g, h, j, k, l, m, n, p, q, r, s, t, $\epsilon R^4$ ($\epsilon R^4$ stands for that the symbol of the left side thereof is representative of four-dimensional real number vector).

In case of $|\det(H)| > \epsilon$ ($\epsilon$: infinitesimal constant), the following eigenvalue equation is given:

$$H^{-1} G \rho + x_3 \rho = 0 \quad (36)$$

(Numerical solutions of eigenvalue equation (generalized eigenvalue equation))

In case of $|\det(H)| > \epsilon$, the eigenvalue equation expressed by equation (36) is solved in accordance with a QR scheme, and in case of $\det(H) \approx 0$, the generalized eigenvalue equation expressed by equation (33) is solved in accordance with a QZ scheme. In this manner, the eigenvalue and the eigenvector are evaluated. With respect to the QR scheme and the QZ scheme, please refer to [Gene H. Golub, Charles F. van Loan, "Matrix Computations", The John Hopkins University Press]. Sets of eigenvalue and the eigenvector exist generally 16 ways, including complex solutions. With respect to the eigenvector, it is normalized in such a manner that the sixteenth component is 1.

At that time, $x_3$, $x_1$ and $x_2$ are derived from the value of the eigenvalue, the twelve component of the eigenvector and the fifth component of the eigenvector, respectively. Hence, the values of the first, second and third joint angles are evaluated from the following equation:

$$\theta_i^{(k)} 2 \arctan (x_i^{(k)}) \quad (37)$$

i=1, 2, 3; k=1, . . . , 16
(Computation of $\theta_4^{(k)}$, $\theta_5^{(k)}$, $\theta_6^{(k)}$)

With respect to $\theta_4^{(k)}$ and $\theta_5^{(k)}$, $\xi$ is evaluated from equation (30); $c_i^{(k)}$ and $s_i^{(k)}$ are evaluated using the thirteenth to sixteenth components of vector $\xi$; and angles $\theta_i^{(k)}$(i=4, 5; k=1, . . . , 16), which are coincident with $c_i^{(k)}$ and $s_i^{(k)}$, are determined.

With respect to $\theta_6^{(k)}$, the values of $c_6^{(k)}$ and $s_6^{(k)}$ are evaluated from the following equation:

$$C_{z,6} = A_5{}^{-1} A_4{}^{-1} A_3{}^{-1} A_2{}^{-1} A_1{}^{-1} A_{hand} C_{x,6}{}^T \quad (38)$$

and $\theta_6^{(k)}$, which is coincident with $c_6^{(k)}$ and $s_6^{(k)}$, are determined.
(Numerical solution 2)

According to the above-mentioned Numerical solution 1, while the square matrix W is produced on a random basis to normalize $U_{16ran}$, here $U_{num}$ is subjected to the singular value resolution and the square matrix W is determined as follows:

$$Q^T U_{num} P = \mathrm{diag}(\sigma_1 \ldots, \sigma_p) \epsilon R(20 \times 16) \quad (39)$$

$Q \epsilon R(20 \times 20)$: orthogonal matrix
$P \epsilon R(20 \times 16)$: orthogonal matrix
$W = Q^T$
where $U_{16ran}$ is normalized.

Subsequent processings are similar to the matter of Numerical solution 1.
(Numerical solution 3)

A solution of the generalized eigenvalue equation needs 2.5 to 3 times of computing time as compared with the usual eigenvalue equation. Therefore, here, there is adopted a scheme in which a direct solution of the generalized eigenvalue equation is avoided as far as possible.

As the square matrix W, the respective components are produced on a random basis in a similar fashion to that of Numerical solution 1.

In equation (33), in case of $\det(H) \approx 0$, the following rational transformation is performed instead of solving the generalized eigenvalue equation in accordance with the QZ scheme.

$$x_3 = (ax_3' + b)/(cx_3' + d) \quad (40)$$

In this case, the generalized eigenvalue equation of equation (33) is expressed as follows:

$$G' \rho + x_3' H' \rho = 0 \quad (41)$$

$G' = dG + bH$
$H' = cG + aH$
$G'$, $H' \epsilon R(16 \times 16)$
$\rho \epsilon C^{16}$
$x_3' \epsilon C$
Generally, $|\det(H')| > \epsilon$
Thus, the following eigenvalue equation is solved.

$$H'^{-1} G' \rho + x_3' \rho = 0 \quad (42)$$

In case of $\det(H') \approx 0$, the generalized eigenvalue equation of equation (41) is directly solved.

The subsequent processings are similar to the matter of Numerical solution 1.
(Numerical solution 4)

As the square matrix W, there is used $Q^T$ which appears when $U_{num}$ is subjected to the singular value resolution in Numerical solution 2. The subsequent processings are similar to the matter of Numerical solution 3.

It is possible to perform at high speed the simulation of the manipulator in accordance with the above-mentioned manner. It is possible, for example, to display the result of the simulation on a screen of a display on a real time basis for use in computer graphics, or to transmit the result of the simulation to a manipulator as a hardware so that the manipulator operates in accordance with the simulation which is carried out on a real time basis.

Next, there will be explained an embodiment of the second manipulator simulation method according to the present invention. Hereinafter, this embodiment will be referred to as "the second embodiment". Also in the second embodiment, the flowchart of FIG. 1 is applicable. Thus, the second embodiment will be explained referring to the flowchart of FIG. 1.

Here, first, in step (a), a matricial equation in the above-mentioned equation (4) is evaluated.

The forward kinematics equation of the manipulator is given by the above-mentioned equation (11), that is:

$$A_{hand} = A_1 \cdot A_2 \cdot A_3 \cdot A_4 \cdot A_5 \cdot A_6 \quad (11)$$

Here, in a similar fashion to that of the first embodiment, 14 fundamental equations (2 scalar equations and 4 vector equations) are derived in accordance with the above equation (11), and then further 6 fundamental equations are derived using the resultant 14 fundamental equations. The combination of the total 20 fundamental equations produces the matricial equation given by the above equation (4).

(Derivation of 14 fundamental equations)

The above equation (14) is rewritten as follows.

$$A_3 \cdot A_4 \cdot A_5 = A_2^{-1} \cdot A_1^{-1} \cdot A_{hand} \cdot A_6^{-1} \quad (43)$$

First, the following fundamental vector equations are derived based on the equation (43).

$$z_A = A_3 A_4 A_5 e_3 = A_2^{-1} A_1^{-1} A_{hand} A_6^{-1} e_3 = z_B \quad (44)$$

$$p_A = A_3 A_4 A_5 e_4 = A_2^{-1} A_1^{-1} A_{hand} A_6^{-1} e_4 = p_B \quad (45)$$

where $e_i$ ($i=1 \ldots 4$) denote unit vectors. In equations (44) and (45), the fourth component becomes an obvious equation like 1=1, 0=0. Thus, hereinafter, the fourth component will be neglected, and it is assumed that equations (44) and (45) denote each a three-dimensional vector comprising the first component, the second component and the third component.

Taking the internal product, the external product and the vector sum based on p and z of equations (44) and (45) may derive the following equations.

$$(p^T \cdot p)_A = (p^T \cdot p)_B \quad (46)$$

$$(p^T \cdot z)_A = (p^T \cdot z)_B \quad (47)$$

$$(p^T \times z)_A = (p^T \times z)_B \quad (48)$$

$$[p \times (p \times z) + (p^T \cdot z)p]_A = [p \times (p \times z) + (p^T \cdot z)p]_B \quad (49)$$

Equation (49) may be rewritten as follows.

$$[2(p^T \cdot z)p - (p^T \cdot p)z]_A = [2(p^T \cdot z)p - (p^T \cdot p)z]_B \quad (50)$$

As a result of the precise analysis using the mathematical expression processing, it is understood that equations (44) to (49) or (50) are of linear with respect to $\cos\theta_i$, $\sin\theta_i$. On the other hand, other combinations each comprising p and z lack a linearity.

To apply the mathematical expression processing, equations (44) to (49) or (50) are resolved beforehand using equations (8) and (9) as follows.

(1) $z_A = z_B$      (51)

$z_A = C_{z,3} C_{x,3} C_4 C_5 e_3$ $\quad = C_2^T C_1^T C_{hand} C_6^T e_3 = z_B$ (2) $p_A = p_B$      (52)

$p_A = C_{z,3}(C_{x,3} C_4 C_{z,5} \cdot t_5 + C_{x,3} C_{z,4} \cdot t_4 + t_3)$ $\quad = -C_2^T (C_1 C_{hand} C_6^T \cdot t_6 - C_1^T \cdot t_{hand} +$ $\quad\quad C_{x,1}^T \cdot t_1) - C_{x,2}^T \cdot t_2$ $\quad = p_B$ (3) $(p^T \cdot p)_A = (p^T \cdot p)_B$      (53)

$(p^T \cdot p)_A = t_3^T \cdot t_3 + 2 t_3^T C_{x,3} C_{z,4} \cdot t_4 +$ $\quad\quad 2 t_3^T C_{x,3} C_4 C_{z,5} \cdot t_5 + t_4^T \cdot t_4 +$ $\quad\quad 2 t_4^T C_{x,4} C_{z,5} \cdot t_5 + t_5^T \cdot t_5$ $\quad = t_2^T \cdot t_2 + 2 t_2^T C_{z,2}^T C_{x,1}^T \cdot t_1 -$ $\quad\quad 2 t_2^T C_{z,2}^T C_1^T \cdot t_{hand} + 2 t_2^T C_{z,2}^T C_1^T \cdot$ $\quad\quad C_{hand} C_{x,6}^T \cdot t_6 + t_1^T \cdot t_1 - 2 t_1^T C_{z,1}^T \cdot$ $\quad\quad t_{hand} + 2 t_1^T C_{z,1}^T C_{hand} C_{x,6}^T \cdot t_6 + t_{hand}^T \cdot$ $\quad\quad t_{hand} - 2 t_{hand}^T C_{hand} C_{x,6}^T \cdot t_6 + t_6^T \cdot t_6$ $\quad = (p^T \cdot p)_B$ (4) $(p^T \cdot z)_A = (p^T \cdot z)_B$      (54)

$(p^T \cdot z)_A = (z^T \cdot p)_A$ $\quad = e_3^T \cdot C_{x,5}^T \cdot t_5 + e_3^T C_5^T C_{x,4}^T \cdot t_4 +$ $\quad\quad e_3^T \cdot C_5^T C_4^T C_{x,3}^T \cdot t_3$ $\quad = -e_3^T t_6 + e_3^T C_6 C_{hand}^T \cdot t_{hand} -$ $\quad\quad e_3^T C_6 C_{hand}^T C_{z,1} \cdot t_1 -$ $\quad\quad e_3^T C_6 C_{hand}^T C_1 C_{z,2} \cdot t_2$ $\quad = (z^T \cdot p)_B$ $\quad = (p^T \cdot z)_B$ (5) $(p^T \times z)_A = (p^T \times z)_B$      (55)

$(p^T \times z)_A = C_{z,3} C_{x,3} C_4 C_{z,5} (t_5 \times C_{x,5} e_3) +$ $\quad\quad C_{z,3} C_{x,3} C_{z,4} (t_4 \times C_{x,4} C_5 e_3) +$ $\quad\quad C_{z,3}(t_3 \times C_{x,3} C_4 C_5 e_3)$ $\quad = -C_2^T C_1^T C_{hand} C_{x,6}^T (t_6 \times C_{z,6} e_3) +$ $\quad\quad C_2^T C_1^T (t_{hand} \times C_{hand} C_6^T e_3) -$ $\quad\quad C_2^T C_{x,1}^T (t_1 \times C_{z,1}^T C_{hand} C_6^T e_3) -$ $\quad\quad C_{x,2}^T (t_2 \times C_{z,2}^T C_1^T C_{hand} C_6^T e_3)$ $\quad = (p^T \times z)_B$ (6) $[2(p^T \cdot z)p - (p^T \cdot p)z]_A$      (56)

$\quad = [2(p^T \cdot z)p - (p^T \cdot p)z]_B$ $\quad [2(p^T \cdot z)p - (p^T \cdot p)z]_A$ $\quad = 2(p^T \cdot z)_A C_{z,3}(C_{x,3} C_4 C_{z,5} \cdot t_5 + C_{x,3} C_{z,4} \cdot$ $\quad\quad t_4 + t_3) - (p^T \cdot p)_A C_{z,3} C_{x,3} C_4 C_5 e_3$ $\quad = 2(p^T \cdot z)_B C_{x,2}^T (C_{z,2}^T C_1^T C_{hand} C_6^T \cdot t_6 -$ $\quad\quad C_{z,2}^T C_1^T \cdot t_{hand} + C_{z,2}^T C_{x,1}^T \cdot t_1 + t_2) -$ $\quad\quad (p^T \cdot p)_B C_2^T C_1^T C_{hand} C_6^T e_3$ $\quad = [2(p^T \cdot z)p - (p^T \cdot p)z]_B$ (Property of the fundamental equations)

Fundamental equations (51) to (56) have the following characteristics.

(a) The respective elements of the matrix $A_{hand}$ representative of the position and attitude of the tip of the manipulator appears only at the right side member.

(b) All the equations do not depend on $\theta_6$.

Because, in equations (51) to (56) $\theta_6$ appears in the form of $C_6{}^T e_3 = C_{x,6}{}^T C_{z,6}{}^T e_3$, but $C_{z,6}{}^T e_3 = [0\ 0\ 1]^T$.

(c) $z_3$, $p_3$, $p^T \cdot z$, $p^T \cdot p$, $(p^T \times z)_3$, $[2(p^T \cdot z)p - (p^T \cdot p)z]_3$ does not depend on $\theta_3$.

Because, the items $(p^T \cdot z)$ and $(p^T \cdot p)$ do not depend on $C_{z,3}$. With respect to $z_3$, $(p^{T \times z})_3$, $[2(p^T \cdot z)p - (p^T \cdot p)z]_3$, $\theta_3$ always appears in the form of $e_3{}^T C_{z,3}$, but $e_3{}^T C_{z,3} = e_{33}{}^T$.

(d) $z_1$, $z_2$, $p_1$, $p_2$, $(p^T \times z)_1$, $(p^T \times z)_2$, $[2(p^T \cdot z)p - (p^T \cdot p)z]_1$, $[2(p^T \cdot z)p - (p^T \cdot p)z]_2$ is linear with respect to $\tan(\theta_3/2)$.

Because, when $x_i = \tan(\theta_i/2)$, the following equations consist:

$$\cos \theta_i = (1 - x_i^2)/(1 + x_i^2)$$

$$\sin \theta_i = 2x_i/(1 + x_i^2)$$

$$X_3{}^- C_{z,3} = X_3{}^+$$

$$X_i^- = \begin{bmatrix} -x_i & 1 & 0 \\ 1 & x_i & 0 \\ 0 & 0 & 1 \end{bmatrix}, X_i^+ = \begin{bmatrix} x_i & 1 & 0 \\ 1 & -x_i & 0 \\ 0 & 0 & 1 \end{bmatrix}. \quad (26)$$

The above results can be obtained by means of multiplying, in $z$, $p$, $p^T \times z$, $2(p^T \cdot z)p - (p^T \cdot p)z$, by $X_3{}^-$ from the left.

(e) $\theta_1$, $\theta_2$, $\theta_4$, $\theta_5$ always appear in the form of a linearity with respect to $\cos\theta_i$, $\sin\theta_i (i=1, 2, 4, 5)$, but the items of $(\cos\theta_i)^2$, $(\sin\theta_i)^2$, $\cos\theta_i \cdot \sin\theta_i$ do not appear.

Because, in $z$, $p$, $p^T \cdot p$, $p^T \cdot z$, $p^T \times z$, there simply appears $C_{z,i}$ once for each item. Further, with respect to $2(p^T \cdot z)p - (p^T \cdot p)z$, it is understood that this is of linear through such a process that the values of $p$, $z$, $p^T \cdot z$, $p^T \cdot p$ are substituted and arranged, taking account of $(\cos\theta_i)^2 + (\sin\theta_i)^2 = 1$, $(\cos\alpha_i)^2 + (\sin\alpha_i)^2 = 1$, using a mathematical expression processing.

(Matrix form of fundamental equations)

The fundamental equations of equations (51) to (56) can be expressed in the matrix form as set forth below.

$$U' \cdot \left[ \begin{array}{c} x_3 \cdot \xi' \\ \xi' \end{array} \right] \cdot (1 + x_1^2)(1 + x_2^2) = V' \cdot \left[ \begin{array}{c} x_3 \cdot \rho \\ \rho \end{array} \right] \quad (58)$$

$U', V' \in R(14 \times 18)$, $\xi'$, $\rho \in C^9$ $\xi' = [s_4 \cdot s_5, s_4 \cdot c_5, c_4 \cdot s_5, c_4 \cdot c_5, s_4, c_4, s_5, c_5, 1]^T$ $\rho = [x_1^2 x_2^2, x_1^2 x_2, x_1^2, x_1 x_2^2, x_1 x_2, x_1, x_2^2, x_2, 1]^T$ The components of $U'$ and $V'$ can be obtained through such a process that equations (51) to (56) are carefully subjected to a mathematical expression processing; $(\cos\theta_i)^2 + (\sin\theta_i)^2 = 1 (i=1, 2)$, $(\cos\alpha_i)^2 + (\sin\alpha_i)^2 = 1 (i=1, \ldots, 6)$, $\cos\theta_i = (1 - x_i^2)/(1 + x_i^2)$, $\sin\theta_i = 2x_i/(1 + x_i^2)$ ($i = 3, 4, 5$) are substituted; and in the resultant algebraic equations the coefficients for the respective items of $\xi'$ and $\rho$ are evaluated.

Each component of $U'$ and $V'$ is a polynomial of several variables in which the components of parameters $t_i$ and $A_{hand}$ are given in the form of variables.

Incidentally, in the second embodiment, $i=4, 5$ are substituted by $i=1, 2$ as compared with the first embodiment.

(Addition of fundamental equations)

With respect to $z_3$, $p_3$, $p^T \cdot z$, $p^T \cdot p$, $(p^T \times z)_3$, $[2(p^T \cdot z)p - (p^T \cdot p)z]_3$, they do not depend on $\theta_3$. Hence it is possible to derive 6 equations as set forth below by means of being multiplied by $x_3 = \tan(\theta_3/2)$ and taking the linear sum.

$$[x_3 z_3 + p_3]_A = [x_3 z_3 + p_3]_B \quad (59)$$

$$[x_3 p_3 + z_3]_A = [x_3 p_3 + z_3]_B \quad (60)$$

$$[x_3 p^T \cdot p + p^T \cdot z]_A = [x_3 p^T \cdot p + p^T \cdot z]_B \quad (61)$$

$$[x_3 p^T \cdot z + p^T \cdot p]_A = [x_3 p^T \cdot z + p^T \cdot p]_B \quad (62)$$

$$[x_3 (p^T \times z)_3 + z_3]_A = [x_3 (p^T \times z)_3 + z_3]_B \quad (63)$$

$$[x_3 \{2(p^T \cdot z)p - (p^T \cdot p)z\}_3] + p_3]_A = \quad (64)$$
$$[x_3 \{2(p^T \cdot z)p - (p^T \cdot p)z\}_3] + p_3]_B$$

When equations (59) to (64) are arranged in a similar fashion to that of equation (58), in which a part of the left side member is transferred to the right side member to be rearranged together with equation (58), there is obtained a matrix equation expressed by the above-mentioned equation (4).

$$U \cdot \xi \cdot (1 + x_4^2)(1 + x_5^2) = V \cdot \left[ \begin{array}{c} x_3 \cdot \rho \\ \rho \end{array} \right] \quad (4)$$

$U \in R(20 \times 16)$, $V \in R(20 \times 18)$, $\xi \in C^{16}$, $\rho \in C^9$ $\xi = [x_3 s_1 s_2, x_3 s_1 c_2, x_3 c_1 s_2, x_3 c_1 c_2, x_3 s_1, x_3 c_1, x_3 s_2,$
$\quad x_3 c_2, s_1 s_2, s_1 c_2, c_1 s_2, c_1 c_2, s_1, c_1, s_2, c_2]^T$ $\rho = [x_4^2 x_5^2, x_4^2 x_5, x_4^2, x_4 x_5^2, x_4 x_5, x_4, x_5^2, x_5, 1]^T$ Incidentally, also in the second embodiment, in a similar fashion to that of the above-mentioned first embodiment, it is acceptable that there is adopted as parameter $t_i$ the above-mentioned equation (10), that is, the D-H parameter as set forth below.

$$t_i = [a_i 0 d_i]^T \quad (10)$$

Further, it is acceptable that instead of the above-mentioned equation (10), there is adopted as parameter $t_i$ a so-called modification D-H parameter as set forth below.

$$t_i = [\xi_i \eta_i \zeta_i + \gamma_i]^T \quad (28)$$

The above-mentioned matters concern the explanation of step (a) of FIG. 1 in connection with the second embodiment.

With respect to the process of step (b) as to the second embodiment, it is simply different from that of the first embodiment in only the point that the numerical substitution of the respective components of the parameter $t_i$ into the matrix equation expressed by equation (4) is performed, instead of the point that the numerical substitution of the respective components of the parameter $t_i$ into the matrix equation expressed by equation (1) is performed in accordance with the first embodiment. Thus, redundant explanation will be omitted.

The numerical substitution of the respective components of the parameter $t_i$ into the matrix equation expressed by equation (4) makes it possible to derive the matrix equation expressed by the above-mentioned equation (5) in which the respective components of $A_{hand}$ are given as variables, that is, the equation as set forth below.

$$U(A_{hand}) \cdot \xi \cdot (1 + x_4^2)(1 + x_5^2) = V(A_{hand}) \cdot \left[ \begin{array}{c} x_3 \cdot \rho \\ \rho \end{array} \right] \quad (5)$$

$U \in R(20 \times 16)$, $V \in R(20 \times 18)$, $\xi \in C^{16}$, $\rho \in C^9$ $\xi = [x_3 s_1 s_2, x_3 s_1 c_2, x_3 c_1 s_2, x_3 c_1 c_2, x_3 s_1, x_3 c_1, x_3 s_2,$
$\quad x_3 c_2, s_1 s_2, s_1 c_2, c_1 s_2, c_1 c_2, s_1, c_1, s_2, c_2]^T$ -continued
$$\rho = [x_4^2x_5^2, x_4^2x_5, x_4^2, x_4x_5^2, x_4x_5, x_4, x_5^2, x_5, 1]^T$$

The matrix equations using the numerical processing terminate at equation (5), that is, step (c) in FIG. 1, and thereafter the whole processes deal with the numerical matrix.

That is, a numerical matrix equation with the numerical matrices $U_{num}$, $V_{num}$ is evaluated (step (e) in FIG. 1) through a numerical substitution (step (d) in FIG. 1) of the respective components of $A_{hand}$ representative of the position and the attitude of the tip of the manipulator into equation (2), and angles $\theta_i^{(k)}$ of rotation (k stands for positive integers to the maximum 16 for discriminating mutually between a plurality of angles $\theta_i$) of the respective joints i are evaluated on the basis of the numerical matrix equation (step (f) in FIG. 1). This numerical matrix equation is expressed by the above-mentioned equation (6), that is, $$U_{num} \cdot \xi \cdot (1 + x_4^2)(1 + x_5^2) = V_{num} \cdot \begin{bmatrix} x_3 \cdot \rho \\ \rho \end{bmatrix} \quad (6)$$

$U \in R(20 \times 16), V \in R(20 \times 18), \xi \in C^{16}, \rho \in C^9$ $$\xi = [x_3s_2s_2, x_3s_1c_2, x_3c_1s_2, x_3c_1c_2, x_3s_1, x_3c_1, x_3s_2,$$
$$x_3c_2, s_1s_2, s_1c_2, c_1s_2, c_1c_2, s_1, c_1, s_2, c_2]^T$$

$$\rho = [x_4^2x_5^2, x_4^2x_5, x_4^2, x_4x_5^2, x_4x_5, x_4, x_5^2, x_5, 1]^T$$

Repetition of step (d) to step (f) makes it possible to perform various simulations on the manipulator model.

Next, there will be explained details of a numerical solution of $\theta_i^{(k)}$, that is, step (f) in FIG. 1 on the basis of the numerical matrix equation given by equation (6).

Figure 4:
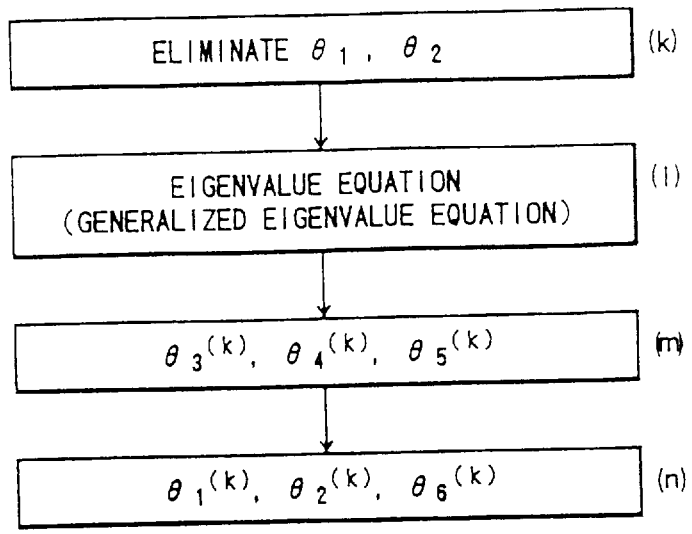
FIG. 4 is a detailed flowchart of step (f) of FIG. 1 in connection with the second embodiment.

FIG. 4 is a detailed flowchart of step (f) in FIG. 1 regarding the second embodiment.

While some numerical solutions will be explained hereinafter, all the numerical solutions comply with step (k) to step (n) in FIG. 4. That is, in any solutions which will be explained hereinafter, to determine $\theta_i^{(k)}$, first, equations, in which $\theta_1$ and $\theta_2$ are eliminated, are evaluated on the basis of the numerical matrix equation given by equation (6) (step (k)). Next, eigenvalue equations or generalized eigenvalue equations are evaluated on the basis of the resultant equations in which $\theta_1$ and $\theta_2$ are eliminated (step (l)). Thereafter, $\theta_3^{(k)}$, $\theta_4^{(k)}$, $\theta_5^{(k)}$ are evaluated on the basis of the resultant eigenvalue equations or generalized eigenvalue equations (step (m)). Then, further, $\theta_1^{(k)}$, $\theta_2^{(k)}$, $\theta_6^{(k)}$ are evaluated (step (n)).

Difference between the second embodiment and the first embodiment resides in the point that first, $\theta_3^{(k)}$, $\theta_4^{(k)}$, $\theta_5^{(k)}$ are evaluated, and then $\theta_1^{(k)}$, $\theta_2^{(k)}$, $\theta_6^{(k)}$ are evaluated. Specifically, the difference between both the embodiments appears in the form of a difference in components of the U and V matrices. In general, according to the second embodiment, a rank of the U and V matrices is high as compared with the first embodiment. This feature may involve a stability in numerical computation.

Hereinafter, there will be explained several numerical solutions according to the flowchart of FIG. 4.

(Numerical solution 5)
(Elimination of $\theta_1$ and $\theta_2$)

To erase $\theta_1$ and $\theta_2$ from the matricial equation given by equation (6), it is multiplied by 20×20 of real matrix W from the left of the equation. The respective components of the real matrix W are produced on a random basis. When the followings are given, $WU_{num} = U_{ran} = [U_{16ran}, U_{4ran}]^T$, $U_{16ran} \in R(16 \times 16)$, $U_{4ran} \in R(4 \times 16)$,
$WV_{num} = V_{ran} = [V_{16ran}, V_{4ran}]^T$, $V_{16ran} \in R(16 \times 18)$, $V_{4ran} \in R(4 \times 18)$, $|\det(U_{16ran})| > \epsilon$ ($\epsilon$: infinitesimal constant) is to be satisfied.

If $\det(U_{16ran}) \approx 0$, the components of the real matrix W is to be reset.

At that time, equation (6) is expressed as follows:

$$\begin{bmatrix} U_{16ran} \\ U_{4ran} \end{bmatrix} \cdot \xi \cdot (1 + x_4^2)(1 + x_5^2) = \begin{bmatrix} V_{16ran} \\ V_{4ran} \end{bmatrix} \begin{bmatrix} x_3 \cdot \rho \\ \rho \end{bmatrix} \quad (65)$$

Hence, $$\xi \cdot (1 + x_4^2)(1 + x_5^2) = U_{16ran}^{-1} \cdot V_{16ran} \begin{bmatrix} x_3 \cdot \rho \\ \rho \end{bmatrix} \quad (66)$$

This is substituted into the remaining four equations of equation (65), so that $\theta_1$ and $\theta_2$ are eliminated. Thus, the following equation is formed.

$$U_{4ran} \cdot U_{16ran}^{-1} \cdot V_{16ran} \begin{bmatrix} x_3 \cdot \rho \\ \rho \end{bmatrix} = V_{4ran} \cdot \begin{bmatrix} x_3 \cdot \rho \\ \rho \end{bmatrix}. \quad (67)$$

(Derivation of eigenvalue equation (generalized eigenvalue equation))

When the following equation is given, $V_{16ran} = [{}^xV_{16ran}, {}^1V_{16ran}]$, $V_{4ran} = [{}^xV_{4ran}, {}^1V_{4ran}]$, ${}^xV_{16ran}, {}^1V_{16ran} \in R(16 \times 9)$, ${}^xV_{4ran}, {}^1V_{4ran} \in R(4 \times 9)$ the above equation (67) is expressed by $$[U_{4ran}U_{16ran}^{-1} \, {}^1V_{16ran} - {}^1V_{4ran}]\rho + \quad (68)$$
$$x_3[U_{4ran}U_{16ran}^{-1} \, {}^xV_{16ran} - {}^xV_{4ran}]\rho = 0$$

When both the side members of equation (68) are multiplied by $x_4 x_5$, $x_4$, $x_5$, further 12 equations are formed, so that total 16 equations are derived. These are expressed by:

$$G \cdot \rho + x_3 H \cdot \rho = 0 \quad (69)$$

$G, H \in R(16 \times 16)$
$\rho \in C^{16}$
$x_3 \in C$ $$G = \begin{bmatrix} abc0 & def0 & ghj0 & 0000 \\ 0abc & 0def & 0ghj & 0000 \\ 0000 & abc0 & def0 & ghj0 \\ 0000 & 0abc & 0def & 0ghj \end{bmatrix} \quad (70)$$

$$H = \begin{bmatrix} klm0 & npq0 & rst0 & 0000 \\ 0klm & 0npq & 0rst & 0000 \\ 0000 & klm0 & npq0 & rst0 \\ 0000 & 0klm & 0npq & 0rst \end{bmatrix} \quad (71)$$

$$\rho = [x_4^3x_5^3, x_4^3x_5^2, x_4^3x_5, x_4^3, x_4^2x_5^3, x_4^2x_5^2, x_4^2x_5,$$
$$x_4^2, x_4x_5^3, x_4x_5^2, x_4x_5, x_4, x_5^3, x_5^2x_5, 1]^T$$

where a, . . . , t are expressed as follows:

$U_{4ran}U_{16ran}^{-1} \, {}^1V_{16ran} - {}^1V_{4ran} = [abcdefghj]$ $U_{4ran}U_{16ran}^{-1} \, {}^xV_{16ran} - {}^xV_{4ran} = [klmnpqrst]$ a, b, c, d, e, f, g, h, j, k, l, m, n, p, q, r, s, t, $\in R^4$.

In case of $|\det(H)| > \epsilon$ ($\epsilon$: infinitesimal constant), the following eigenvalue equation is given:

$$H^{-1}G\rho + x_3\rho = 0 \tag{72}$$

(Numerical solutions of eigenvalue equation (generalized eigenvalue equation))

In case of $|\det(H)| > \epsilon$, the eigenvalue equation expressed by equation (72) is solved in accordance with a QR scheme, and in case of $\det(H) \approx 0$, the generalized eigenvalue equation expressed by equation (69) is solved in accordance with a QZ scheme. In this manner, the eigenvalue and the eigenvector are evaluated. With respect to the QR scheme and the QZ scheme, please refer to the above-referenced [Gene H. Golub, Charles F. van Loan "Matrix Computations", The John Hopkins University Press]. Sets of eigenvalue and the eigenvector exist generally 16 ways, including complex solutions. With respect to the eigenvector, it is normalized in such a manner that the sixteenth component is 1.

At that time, $x_3$, $x_4$ and $x_5$ are derived from the value of the eigenvalue, the twelve component of the eigenvector and the fifth component of the eigenvector, respectively. Hence, the values of the first, second and third joint angles are evaluated from the following equation:

$$\theta_i^{(k)} = 2 \arctan(x_i^{(k)}) \tag{73}$$

i=3, 4, 5; k=1, ..., 16

(Computation of $\theta_1^{(k)}$, $\theta_2^{(k)}$, $\theta_6^{(k)}$)

With respect to $\theta_1^{(k)}$ and $\theta_2^{(k)}$, $\xi$ is evaluated from equation (66); $c_i^{(k)}$ and $s_i^{(k)}$ are evaluated using the thirteenth to sixteenth components of vector $\xi$; and angles $\theta_i^{(k)}$ (i=1, 2; k=1, ..., 16), which are coincident with $c_i^{(k)}$ and $s_i^{(k)}$, are determined.

With respect to $\theta_6^{(k)}$, the values of $c_6^{(k)}$ and $s_6^{(k)}$ are evaluated from the following equation:

$$C_{z,6} = A_5^{-1} A_4^{-1} A_3^{-1} A_2^{-1} A_1^{-1} A_{hand} C_{x,6}^T \tag{74}$$

and $\theta_6^{(k)}$, which is coincident with $c_6^{(k)}$ and $s_6^{(k)}$, are determined.

(Numerical solution 6)

According to the above-mentioned Numerical solution 5, while the square matrix W is produced on a random basis to normalizes $U_{16tan}$, here, $U_{num}$ is subjected to the singular value resolution and the square matrix W is determined as follows:

$$Q^T U_{num} P = \text{diag}(\sigma_1, \ldots, \sigma_p) \in R(20 \times 16) \tag{75}$$

$Q \in R(20 \times 20)$: orthogonal matrix
$P \in R(20 \times 16)$: orthogonal matrix
$W = Q^T$
Where $U_{16ran}$ is normalized.

Subsequent processings are similar to the matter of Numerical solution 5.

(Numerical solution 7)

A solution of the generalized eigenvalue equation needs 2.5 to 3 times of computing time as compared with the usual eigenvalue equation. Therefore, here, there is adopted a scheme in which a direct solution of the generalized eigenvalue equation is avoided as far as possible.

As the square matrix W, the respective components are produced on a random basis in a similar fashion to that of Numerical solution 5.

In equation (69), in case of $\det(H) \approx 0$, the following rational transformation is performed instead of solving the generalized eigenvalue equation in accordance with the QZ scheme.

$$x_3 = (ax_3' + b)/(cx_3' + d) \tag{76}$$

In this case, the generalized eigenvalue equation of equation (69) is expressed as follows:

$$G'\rho + x_3' H'\rho = 0 \tag{77}$$

G' = dG + bH
H' = cG + aH
G', H' $\in R(16 \times 16)$
$\rho \in C^{16}$
$x_3' \in C$
Generally, $|\det(H')| > \epsilon$
Thus, the following eigenvalue equation is solved.

$$H'^{-1}G'\rho + x_3'\rho = 0 \tag{78}$$

In case of $\det(H') \approx 0$, the generalized eigenvalue equation of equation (77 is directly solved.

The subsequent processings are similar to the matter of Numerical solution 5.

(Numerical solution 8)

As the square matrix W, there is used $Q^T$ which appears when $U_{num}$ is subjected to the singular value resolution in Numerical solution 6. The subsequent processings are similar to the matter of Numerical solution 7.

(Numerical solution 9)

Here, $\xi$ is evaluated directly from equation (6) instead of passing through equation (66) in the process in which $\theta_1$ and $\theta_2$ are eliminated from equation (6) in step (k) of FIG. 3.

In equation (6), while $U_{num}$ is not the square matrix, its rank is 16. Consequently, when Gaussian elimination method is applied to $U_{num}$, the matrix $U_{num}$ may be transformed as follows:

$$U_{num} \rightarrow \begin{bmatrix} 1 & & & & & & \\ & 1 & & & 0 & & \\ & & 1 & & & & \\ & & & \ddots & & & \\ & & & & \ddots & & \\ & 0 & & & \ddots & & \\ & & & & & 1 \\ \hline & & & 0 & & & \end{bmatrix} \begin{matrix} \uparrow \\ 16 \\ \downarrow \\ \uparrow \\ 4 \\ \downarrow \end{matrix} \tag{79}$$

$$\leftarrow 16 \rightarrow$$

When a method of elimination of equation (79) is applied to both the side members of equation (6), equation (6) may be transformed as follows:

$$\begin{bmatrix} 1 & & & & & \\ & 1 & & 0 & & \\ & & 1 & & & \\ & & & \ddots & & \\ 0 & & & \ddots & & \\ & & & & 1 \\ \hline & & 0 & & & \end{bmatrix} \cdot \xi \cdot (1 + x_4^2)(1 + x_5^2) = \begin{bmatrix} V'_{16num} \\ V'_{4num} \end{bmatrix} \begin{bmatrix} x_3 \cdot \rho \\ \rho \end{bmatrix} \tag{80}$$

$V'_{16num} \in R(16 \times 18)$, $V'_{4num} \in R(4 \times 18)$

The following equation may be derived from equation (80).

$$V'_{4num} \cdot \left[ \frac{x_3 \cdot \rho}{\rho} \right] = 0 \tag{81}$$

$V'_{4num}$ is resolved as follows:

$$V'_{4num} = [{}^xV'_{4ran}, {}^1V'_{4ran}]$$

$${}^xV'_{4ran}, {}^1V'_{4ran} \in R(4 \times 9)$$

And when the following equations are given, $${}^1V'_{4ran} = [abcdefghj]$$

$${}^xV'_{4ran} = [klmnpqrst]$$

there are obtained the eigenvalue equations similar to equations (69)–(71).

The subsequent processings are similar to the numerical solution 5.

An adoption of the above-mentioned numerical solution 9 makes it possible to desirably maintain a regularity (det(H)≠0) of matrix H as compared with the numerical solutions 5 to 8, thereby evaluating the solutions of the eigenvalue equations with greater accuracy.
(Numerical solution 10)

When the regularity of the matrix H determined in numerical solution 9 is not maintained, a rational transformation of equation (76) is performed. The subsequent processings are similar to the numerical solution 7.

Also in the second embodiment, similar to the first embodiment, it is possible to perform at high speed the simulation of the manipulator in accordance with the above-mentioned manner. Therefore, it is possible to display the result of the simulation on a screen of a display, while the simulation is performed on a real time basis in computer graphics, and also to control a manipulator as a hardware, while the simulation is performed on a real time basis.

Figure 5:
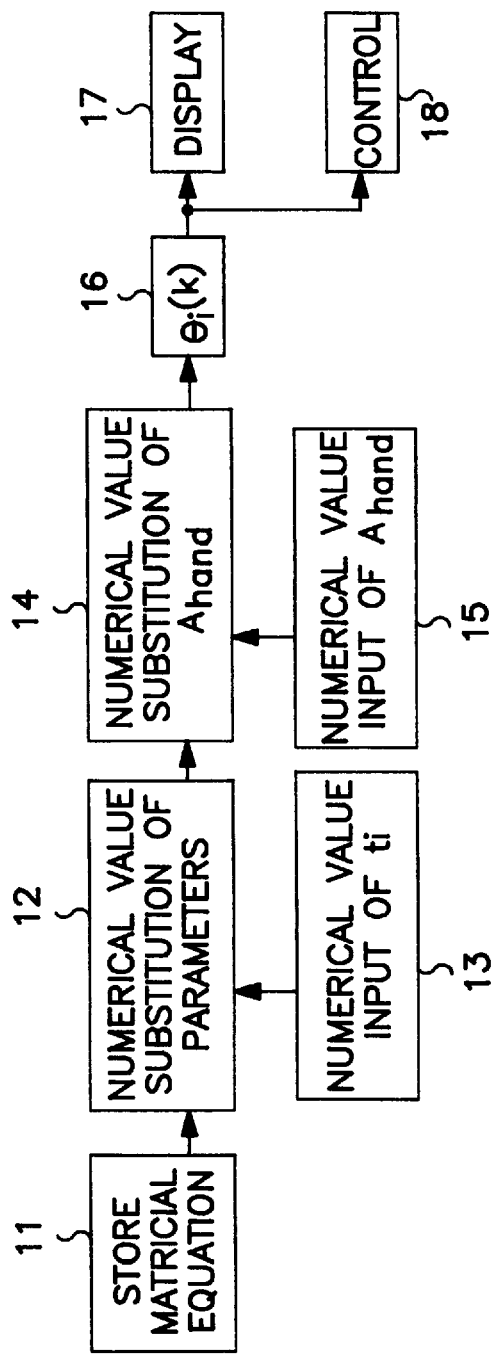
FIG. 5 is a block diagram showing an embodiment of the first manipulator simulation apparatus according to the present invention.

FIG. 5 is a block diagram showing an embodiment of the first manipulator simulation apparatus according to the present invention. Hereinafter, this embodiment is referred to as "third embodiment". With respect to the operational algorithm, it has been described in detail in connection with the first embodiment and the second embodiment. Consequently, in the third embodiment and the subsequent embodiments, there will be omitted the detailed description of the operational algorithm, and in case of need the number of the above-mentioned mathematical expressions is simply referred to.

A manipulator simulation apparatus shown in FIG. 5 is provided with storage means 11 for storing the above-mentioned matrix equation (1). While it is acceptable that the storage means 11 is one for storing the matrix equation (1) on a fixed storage basis, there is no need to adopt such a type of storage means. It is also acceptable to adopt storage means for storing the matrix equation (1) through loading the same from an external storage medium such as a floppy disk.

The matrix equation (1) stored in storage means 11 is read out on parameter numerical value substitution means 12 in which the numerical values of the respective components of parameter $t_i$ inputted from input means 13 are substituted into the read matrix equation (1) thereby producing the above-mentioned matrix equation (2). While it is acceptable that the input means 13 may be, for example, a keyboard and the like, one for manually inputting the respective components of parameter $t_i$, the input means 13 is not restricted to such a type of input means as mentioned above. It is also acceptable to adopt, for example, one in which numerical information of the respective components of parameter $t_i$ stored beforehand is read out to be loaded into the parameter numerical value substitution means 12, or another in which numerical information of the respective components of parameter $t_i$ transmitted from the exterior passing through communication lines is received and transferred to the parameter numerical value substitution means 12.

The matrix equation (2) produced by the parameter numerical value substitution means 12 is inputted to numerical value matrix equation derivation means 14 in which the numerical values of the respective components (elements) of $A_{hand}$ inputted from input means 15 are substituted into the matrix equation (2) thereby producing the above-mentioned numerical matrix equation (3). The input means 15 may also be given with various constitutions in a similar fashion to that of the above-mentioned input means 13. It is acceptable that the input means 15 is physically the same as the above-mentioned input means 13.

The numerical matrix equation (3) derived by the numerical value matrix equation derivation means 14 is inputted to a joint rotation angle computing means 16 in which rotation angle $\theta_i^{(k)}$ of the joint is evaluated in accordance with any one of the above-mentioned numerical value solutions 1 to 4, or their combination.

The rotation angle $\theta_i^{(k)}$ of the joint thus evaluated is transmitted to a display means 17 to be displayed on a computer graphics display basis, and/or transmitted to a control means 18 to be used for a control of the rotation angle of the joint of a manipulator as the actual hardware.

It is sufficient for the manipulator simulation apparatus, at the time of the actual simulation except for an initial preparation, to repeat solving the numerical matrix equation adopting the numerical value input and any one of the above-mentioned numerical value solutions 1 to 4, thereby implementing a high speed simulation.

Figure 6:
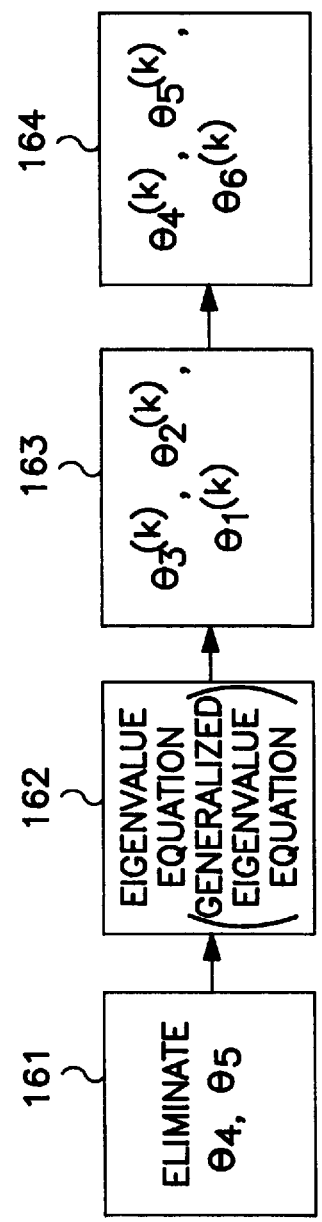
FIG. 6 is a detailed block diagram of means for calculating angles of rotation of joints as shown in FIG. 5.

FIG. 6 is a detailed block diagram of the joint rotation angle computing means 16 in the third embodiment as shown in FIG. 5.

The joint rotation angle computing means 16 comprises means 161 for eliminating $\theta_4$ and $\theta_5$ on the basis of the numerical matrix equation given by equation (3), means 162 for determining eigenvalue equations or generalized eigenvalue equations on the basis of the resultant equations in which $\theta_4$ and $\theta_5$ are eliminated, means 163 for computing $\theta_3^{(k)}$, $\theta_2^{(k)}$, $\theta_1^{(k)}$ on the basis of the resultant eigenvalue equations or generalized eigenvalue equations, and means 164 for computing $\theta_4^{(k)}$, $\theta_5^{(k)}$, $\theta_6^{(k)}$. The algorithm to be effected in each of means 161 to 164 has been explained in connection with the above-mentioned numerical value solutions 1 to 4. Consequently, the redundant explanation will be omitted.

Figure 7:
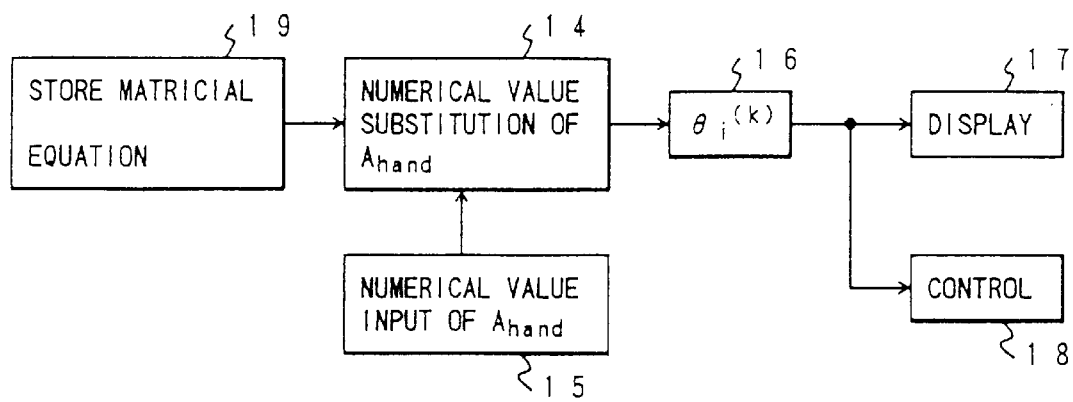
FIG. 7 is a block diagram showing an embodiment of the second manipulator simulation apparatus according to the present invention.

FIG. 7 is a block diagram showing an embodiment of the second manipulator simulation apparatus according to the present invention. Hereinafter, this embodiment will be referred to as the fourth embodiment.

The manipulator simulation apparatus shown in FIG. 7, is provided with storage means 19 for storing the above-mentioned matrix equation (2), that is, the matrix equation after numerical entry of the respective components of the parameter $t_i$. Other arrangements are similar to that of the third embodiment, and thus the redundant explanation will be omitted.

While it is acceptable that the storage means 19 is, similar to the storage means 11 in the third embodiment of FIG. 5, one for storing the matrix equation (2) on a fixed storage basis, there is no need to adopt such a type of storage means as mentioned above. It is also acceptable to adopt storage means for temporarily storing during the simulation the matrix equation (2) loaded from an external storage medium such as a floppy disk, or the matrix equation (2) produced by arithmetic operation means not illustrated.

When there is a need to perform a simulation of various constitutions of manipulator, as in the third embodiment of FIG. 5, it is necessary to input numerical values as to the respective components of the parameter $t_i$ suitable for the manipulator on which the simulation is intended to be effected. However, in case of apparatuses for implementing the simulation of the existing specified manipulator, for example, an apparatus which is exclusively used for a control of the manipulator as the specified existing hardware, there is no need to provide such an arrangement that the respective components of the parameter $t_i$ can be entered in the form of the numerical value. It is acceptable, as in the fourth embodiment shown in FIG. 7, to store beforehand the matrix equation (2) in which the respective components of the parameter $t_i$ as to the specified manipulator are entered in the form of the numerical value.

Next, there will be explained an embodiment of the third manipulator simulation apparatus according to the present invention. Hereinafter, this embodiment will be referred to as the fifth embodiment.

The block diagram of the fifth embodiment is the same as that of the third embodiment shown in FIG. 5. Consequently, the fifth embodiment will be explained again referring to FIG. 5 hereinafter.

A manipulator simulation apparatus, as the fifth embodiment, shown in FIG. 5 is provided with storage means 11 for storing the above-mentioned matrix equation (1). While it is acceptable that the storage means 11 is one for storing the matrix equation (1) on a fixed storage basis, there is no need to adopt such a type of storage means. It is also acceptable to adopt storage means for storing the matrix equation (1)through loading the same from an external storage medium such as a floppy disk.

The matrix equation (4) stored in storage means 11 is read out on parameter numerical value substitution means 12 in which the numerical values of the respective components of parameter $t_i$ inputted from input means 13 are substituted into the read matrix equation (4) thereby producing the above-mentioned matrix equation (5). While it is acceptable that the input means 13 may be, for example, a keyboard and the like, one for manually inputting the respective components of parameter $t_i$, the input means 13 is not restricted to such a type of input means as mentioned above. It is also acceptable to adopt, for example, one in which numerical information of the respective components of parameter $t_i$ stored beforehand is read out to be loaded into the parameter numerical value substitution means 12, or another in which numerical information of the respective components of parameter $t_i$ transmitted from the exterior passing through communication lines is received and transferred to the parameter numerical value substitution means 12.

The matrix equation (5) produced by the parameter numerical value substitution means 12 is inputted to numerical value matrix equation derivation means 14 in which the numerical values of the respective components (elements) of $A_{hand}$ inputted from input means 15 are substituted into the matrix equation (5) thereby producing the above-mentioned numerical matrix equation (6). The input means 15 may also be given with various constitutions in a similar fashion to that of the above-mentioned input means 13. It is acceptable that the input means 15 is physically the same as the above-mentioned input means 13.

The numerical matrix equation (6) derived by the numerical value matrix equation derivation means 14 is inputted to a joint rotation angle computing means 16 in which rotation angle $\theta_i^{(k)}$ of the joint is evaluated in accordance with any one of the above-mentioned numerical value solutions 5 to 10 of the equation (6), or their combination.

The rotation angle $\theta_i^{(k)}$ of the joint thus evaluated is transmitted to a display means 17 to be displayed on a computer graphics display basis, and/or transmitted to a control means 18 to be used for a control of the rotation angle of the joint of a manipulator as the actual hardware.

It is sufficient for the manipulator simulation apparatus, at the time of the actual simulation except for an initial preparation, to repeat solving the numerical matrix equation adopting the numerical value input and any one of the above-mentioned numerical value solutions 5 to 10, thereby implementing a high speed simulation.

Figure 8:
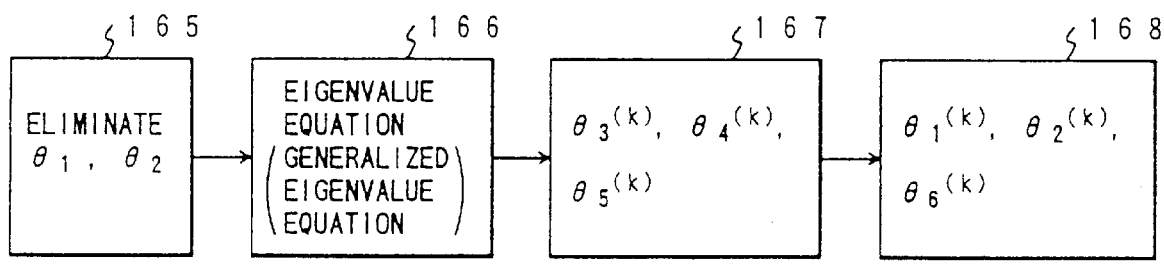
FIG. 8 is a detailed block diagram of means for calculating angles of rotation of joints as shown in FIG. 5 in connection with the fifth embodiment.

FIG. 8 is a detailed block diagram of the joint rotation angle computing means 16 in the fifth embodiment as shown in FIG. 5.

The joint rotation angle computing means 16 comprises means 165 for eliminating $\theta_1$ and $\theta_2$ on the basis of the numerical matrix equation given by equation (6), means 166 for determining eigenvalue equations or generalized eigenvalue equations on the basis of the resultant equations in which $\theta_1$ and $t_2$ are eliminated, means 167 for computing $\theta_3^{(k)}$, $\theta_2^{(k)}$, $\theta_1^{(k)}$ on the basis of the resultant eigenvalue equations or generalized eigenvalue equations, and means 168 for computing $\theta_1^{(k)}$, $\theta_2^{(k)}$, $\theta_6^{(k)}$. The algorithm to be effected in each of means 165 to 168 has been explained in connection with the above-mentioned numerical value solutions 5 to 10. Consequently, the redundant explanation will be omitted.

Next, there will be explained an embodiment of the fourth manipulator simulation apparatus according to the present invention. Hereinafter, this embodiment will be referred to as the sixth embodiment.

The block diagram of the sixth embodiment is the same as that of the fourth embodiment shown in FIG. 7. Consequently, the sixth embodiment will be explained again referring to FIG. 7 hereinafter.

The manipulator simulation apparatus shown in FIG. 7 according to the sixth embodiment, is provided with storage means 19 for storing the above-mentioned matrix equation (5), that is, the matrix equation after numerical entry of the respective components of the parameter $t_i$. Other arrangements are similar to that of the fifth embodiment shown in FIG. 5, and thus the redundant explanation will be omitted.

While it is acceptable that the storage means 19 is, similar to the storage means 11 in the third embodiment of FIG. 5, one for storing the matrix equation (5) on a fixed storage basis, there is no need to adopt such a type of storage means as mentioned above. It is also acceptable to adopt storage means for temporarily storing during the simulation the matrix equation (5) loaded from an external storage medium such as a floppy disk, or the matrix equation (5) produced by arithmetic operation means not illustrated.

When there is a need to perform a simulation of various constitutions of manipulator, as in the fifth embodiment of FIG. 5, it is necessary to input numerical values as to the respective components of the parameter $t_i$ suitable for the manipulator on which the simulation is intended to be effected. However, in case of apparatuses for implementing the simulation of the existing specified manipulator, for example, an apparatus which is exclusively used for a control of the manipulator as the specified existing hardware, there is no need to provide such an arrangement that the respective components of the parameter $t_i$ can be entered in the form of the numerical value. It is acceptable, as in the sixth embodiment shown in FIG. 7, to store beforehand the matrix equation (5) in which the respective components of the parameter $t_i$ as to the specified manipulator are entered in the form of the numerical value.

As described above, according to the present invention, objects, which can be processed in accordance with the mathematical expression processing, are processed in accordance with the mathematical expression processing as much as possible, and finally only portions, which are obliged to be processed in accordance with the numerical value solutions, are processed in accordance with the numerical value processing through inputting $A_{hand}$. This feature makes it possible to reduce an operating time, and thus the system according to the present invention is suitable for a real time processing.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A manipulator simulation method, for use on a computer, adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, the method comprising:

when a homogeneous coordinates transformation matrix $A_{hand}$ representative of the position and the orientation of the tip of the manipulator using an absolute coordinate system expressed by $$A_{hand} = \left[\begin{array}{c|c} C_{hand} & t_{hand} \\ \hline 0 & 1 \end{array}\right] = \left[\begin{array}{ccc|c} n_x & s_x & a_x & p_x \\ n_y & s_y & a_y & p_y \\ n_z & s_z & a_z & p_z \\ \hline 0 & 0 & 0 & 1 \end{array}\right]$$

where $C_{hand}$ denotes an orientation, and $t_{hand}$ denotes a position, and the homogeneous coordinates transformation matrix A, representative of the position and the orientation of the (i+1)th coordinate system using the i-th coordinate system, of all the coordinate systems sequentially assigned from the rear end of the manipulator toward the top, is expressed by $$A_i = \left[\begin{array}{c|c} C_i & C_{z,i} \cdot t_i \\ \hline 0 & 1 \end{array}\right]$$

where:

i=1, 2, . . . , 6

$C_i = C_{z,i} \cdot C_{x,i}$ $$C_{z,i} = \begin{bmatrix} c_i & -s_i & 0 \\ s_i & c_i & 0 \\ 0 & 0 & 1 \end{bmatrix}$$

-continued $$C_{x,i} = \begin{bmatrix} 1 & 0 & 0 \\ 0 & \lambda_i & -\mu_i \\ 0 & \mu_i & \lambda_i \end{bmatrix}$$

$c_i = \cos\theta_i$, $S_i = \sin\theta_i$, $\lambda_i = \cos\alpha_i$, $\mu_i = \sin\alpha_i$ $\theta_i$ denotes an angle of rotation of the i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix;

evaluating a matrix equation (1) based on said homogeneous coordinates transformation matrix $A_{hand}$ and said homogeneous coordinates transformation matrix $A_i$, matrix equation (1) being:

$$U \cdot \xi \cdot (1 + x_1^2)(1 + x_2^2) = V \cdot \left[\begin{array}{c} x_3 \cdot \rho \\ \hline \rho \end{array}\right]$$

where U denotes 20×16 of real number matrix,
V denotes 20×18 real number matrix, $\xi = [x_3\ s_4\ s_5,\ x_3\ s_4\ c_5,\ x_3\ c_4\ s_5,\ x_3\ c_4\ c_5,$ $x_3\ s_4,\ x_3\ c_4,\ x_3\ s_5,\ x_3\ c_5,\ s_4\ s_5,\ s_4\ c_5,\ c_4\ s_5,\ c_4\ c_5,\ s_4,\ c_4,\ s_5,\ c_5]^T$, $\rho = [x_1^2\ x_2^2,\ x_1^2\ x_2,\ x_1^2,\ x_1\ x_2^2,\ x_1\ x_2,\ x_1,\ x_2^2,\ x_2,\ 1]^T$, $X_i = \tan(\theta_i/2)$;

deriving a matrix equation (2) by a numerical value substitution or respective components of the parameter $t_i$ into the matrix equation expressed by equation (1) in which respective components of said homogeneous coordinates transformation matrix $A_{hand}$ are given as variables, matrix equation (2) being:

$$U(A_{hand}) \cdot \xi \cdot (1 + x_1^2)(1 + x_2^2) = V(A_{hand}) \cdot \left[\begin{array}{c} x_3 \cdot \rho \\ \hline \rho \end{array}\right]$$

where $U(A_{hand})$ and $V(A_{hand})$ stand for matrices in which the respective components of said homogeneous coordinates transformation matrix $A_{hand}$ are given as variables, said matrices being produced by numerical value substitution of respective components of the parameter $t_i$ into said matrices U and V, respectively;

deriving a numerical value matrix equation (3) by a numerical value substitution of respective components of said homogeneous coordinates transformation matrix $A_{hand}$ into the matrix equation expressed by equation (2), matrix equation (3) being:

$$U_{num} \cdot \xi \cdot (1 + x_1^2)(1 + x_2^2) = V_{num} \cdot \left[\begin{array}{c} x_3 \cdot \rho \\ \hline \rho \end{array}\right]$$

where $U_{num}$ and $V_{num}$ stand for numerical value matrices produced by numerical value substitution of the respective components of said homogeneous coordinates transformation matrix $A_{hand}$ into said matrices $U(A_{hand})$ and $V(A_{hand})$, respectively;

evaluating angles $\theta_i^{(k)}$ of rotation, where k stands for positive integers to the maximum 16 for discriminating mutually between a plurality of angles $\theta_i$, of the joints on the basis of the numerical value matrix equation expressed by equation (3); and determining whether a manipulator constructed based on the simulated manipulator will operate as desired and is capable of implementing a desired position and orientation of the tip of the manipulator.

2. A manipulator simulation method according to claim 1, wherein to evaluate said angles $\theta_i^{(k)}$ of rotation on the basis of the numerical value matrix equation expressed by equation (3):

equations, in which $\theta_4$ and $\theta_5$ are eliminated, and evaluated on the basis of the numerical value matrix equation given by equation (3);

eigenvalue equations or generalized eigenvalue equations are evaluated on the basis of the resultant equations in which $\theta_4$ and $\theta_5$ are eliminated; and said angles $\theta_i^{(k)}$ of rotation are evaluated on the basis of the resultant eigenvalue equations or generalized eigenvalue equations.

3. A manipulator simulation method, for use on a computer, adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, the method comprising:

when a homogeneous coordinates transformation matrix $A_{hand}$ representative of the position and the orientation of the tip of the manipulator using an absolute coordinate system is expressed by $$A_{hand} = \left[\begin{array}{c|c} C_{hand} & t_{hand} \\ \hline 0 & 1 \end{array}\right] = \left[\begin{array}{ccc|c} n_x & s_x & a_x & p_x \\ n_y & s_y & a_y & p_y \\ n_z & s_z & a_z & p_z \\ \hline 0 & 0 & 0 & 1 \end{array}\right]$$

where $C_{hand}$ denotes an orientation, and $t_{hand}$ denotes a position, and the homogeneous coordinates transformation matrix $A_i$ representative of the position and the orientation of the (1+I)th coordinate system looking a the i-th cordinate system, of all the coordinate systems sequentially assigned form the rear end of the maipulator toward the top, is expressed by $$A_i = \left[\begin{array}{c|c} C_i & C_{z,i} \cdot t_i \\ \hline 0 & 1 \end{array}\right]$$

where i=1, 2, . . . , 6

$C = C_{z,i} \cdot C_{x,i}$ $$C_{z,i} = \left[\begin{array}{ccc} c_i & -s_i & 0 \\ s_i & c_i & 0 \\ 0 & 0 & 1 \end{array}\right]$$

$$C_{x,i} = \left[\begin{array}{ccc} 1 & 0 & 0 \\ 0 & \lambda_i & -\mu_i \\ 0 & \mu_i & \lambda_i \end{array}\right]$$

$c_i = \cos\theta_i$, $S_i = \sin\theta_i$ $\lambda_i = \cos\alpha_i$, $\mu_i = \sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix;

evaluating a matrix equation (1) based on said homogeneous coordinates transformation matrix $A_{hand}$ and said homogeneous coordinates tranformation matrix $A_i$, matrix equation (1) being:

$$U \cdot \xi \cdot (1 + x_4^2)(1 + x_5^2) = V \cdot \left[\begin{array}{c} x_3 \cdot \rho \\ \rho \end{array}\right]$$

where U denotes 20×16 of real number matrix,

V denotes 20×18 or real number matrix, $\xi = [x_3 s_1 s_2, x_3 s_1 c_2, x_3 c_1 s_2, x_3 c_1 c_2, x_3 s_1, x_3 c_1,$
$x_3 s_2, x_3 c_2, s_1 s_2, s_1 c_2, c_1 s_2, c_1 c_2, s_1, c_1, s_2, c_2]^\tau,$ $\rho = [x_4^2 x_5^2, x_4^2 x_5, x_4^2, x_4 x_5^2, x_4 x_5, x_4, x_5^2, x_5, 1]^\tau,$ $X_i = \tan(\theta_i/2)$;

deriving a matrix equation (5) by a numerical value substitution of respective components of the parameter $t_i$ into the matrix equation expressed by equation (4) in which respective components of said homogeneous coordinates transformation matrix $A_{hand}$ are given as variables, matrix equation (5) being:

$$U(A_{hand}) \cdot \xi \cdot (1 + x_4^2)(1 + x_5^2) V(A_{hand}) \cdot \left[\begin{array}{c} x_3 \cdot \rho \\ \rho \end{array}\right]$$

where $U(A_{hand})$ and $V(A_{hand})$ stand for matrices in which the respective components of said homogeneous coordinates transformation matrix $A_{hand}$ are given as variables, said matrices being produced by a numerical value substitution of respective components of the parameter $t_i$ into said matrices U and V, respectively;

deriving a numerical value matrix equation (6) by a numerical value substitution of respective components of said homogeneous coordinates transformation matrix $A_{hand}$ into the matrix equation expressed by equation (5), numerical value matrix equation (6) being:

$$U_{num} \cdot \xi \cdot (1 + x_4^2)(1 + x_5^2) = V_{num} \cdot \left[\begin{array}{c} x_3 \cdot \rho \\ \rho \end{array}\right]$$

where $U_{num}$ and $V_{num}$ stand for numerical value matrices produced by numerical value substitution of the respective components of said homogeneous coordinates transformation matrix $A_{hand}$ into said matrices $U(A_{hand})$ and $V(A_{hand})$, respectively;

evaluating angles $\theta_i^{(k)}$ of rotation, where k stands for positive integers to the maximum 16 for discriminating mutually between a plurality of angles $\theta_i$, of the joints on the basis of the numerical value matrix equation expressed by equation (6); and determining whether a manipulator constructed based on the simulated manipulator will operate as desired and is capable of implementing a desired position and orientation of the tip of the manipulator.

4. A manipulator simulation method according to claim 3, wherein to evaluate said angles $\theta_i^{(k)}$ of rotation on the basis of the numerical value matrix equation expressed by equation (6):

equations, in which $\theta_1$ and $\theta_2$ are eliminated, are evaluated on the basis of the numerical value matrix equation given by equation (6);

eigenvalue equations or generalized eigenvalue equations are evaluated on the basis of the resultant equations in which $\theta_1$ and $\theta_2$ are evaluated on the basis of the resultant equations in which $\theta_1$ and $\theta_2$ are eliminated; and said angles $\theta_1^{(k)}$ of rotation are evaluated on the basis of the resultant eigenvalue equations or generalized eigenvalue equations.

5. A manipulator simulation apparatus embodied on a computer, adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ representative of the position and the orientation of the tip of the manipulator looking at an absolute coordinate system is expressed by $$A_{hand} = \left[\begin{array}{c|c} C_{hand} & t_{hand} \\ \hline 0 & 1 \end{array}\right] = \left[\begin{array}{ccc|c} n_x & s_x & a_x & p_x \\ n_y & s_y & a_y & p_y \\ n_z & s_z & a_z & p_z \\ \hline 0 & 0 & 0 & 1 \end{array}\right]$$

where $C_{hand}$ denotes an orientation, and $t_{hand}$ denotes a position, and the homogeneous coordinates transformation matrix $A_i$ representative of the position and the orientation of the (i+1)th coordinate system using the i-th coordinate system, of all the coordinate systems sequentially assigned from the rear end of the manipulator toward the top, is expressed by $$A_i = \left[\begin{array}{c|c} C_i & C_{z,i} \cdot t_i \\ \hline 0 & 1 \end{array}\right]$$

where:

i=1, 2, . . . , 6

$C_i = C_{z,i} \cdot C_{x,i}$ $$C_{z,i} = \begin{bmatrix} c_i & -s_i & 0 \\ s_i & c_i & 0 \\ 0 & 0 & 1 \end{bmatrix}$$

$$C_{x,i} = \begin{bmatrix} 1 & 0 & 0 \\ 0 & \lambda_i & -\mu_i \\ 0 & \mu_i & \lambda_i \end{bmatrix}$$

$c_i = \cos\theta_i$, $S_i = \sin\theta_i$ $\lambda_i = \cos\alpha_i$, $\mu_i = \sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix, said apparatus comprises:

storage means for storing a matrix equation (1) evaluated based on said homogeneous coordinates transformation matrix $A_{hand}$ and said homogeneous coordinates transformation matrix $A_i$, $$U \cdot \xi \cdot (1 + x_1^2)(1 + x_2^2) = V \cdot \left[\begin{array}{c} x_3 \cdot \rho \\ \hline \rho \end{array}\right] \quad (1)$$

where U denotes 20×16 of real number matrix,

V denotes 20×18 of real number matrix, $\xi = [x_3 s_4 s_5, x_3 s_4 c_5, x_3 c_4 s_5, x_3 c_4 c_5, x_3 s_4, x_3 c_4, x_3 s_5, x_3 c_5, s_4 s_5, s_4 c_5, c_4 s_5, c_4 c_5, s_4, c_4, s_5, c_5]^T$, $\rho = [x_1^2 x_2^2, x_1^2 x_2, x_1^2, x_1 x_2^2, x_1 x_2, x_1, x_2^2, x_2, 1]^T$, and $X_i = \tan(\theta_i/2)$;

first input means for inputting respective components of the parameter $t_i$ in the form of numerical value;

parameter numerical value substitution means for, by a numerical value substitution of respective components of the parameter $t_i$ entered through said first input means into the matrix equation expressed by equation (1), deriving a matrix equation expressed by equation (2) in which respective components of said homogeneous coordinates transformation matrix $A_{hand}$ are given as variables, $$U(A_{hand}) \cdot \xi \cdot (1 + x_1^2)(1 + x_2^2) = V(A_{hand}) \cdot \left[\begin{array}{c} x_3 \cdot \rho \\ \hline \rho \end{array}\right] \quad (2)$$

where $U(A_{hand})$ and $V(A_{hand})$ stand for matrices in which the respective components of said homogeneous coordinates transformation matrix $A_{hand}$ are given as variables, said matrices being produced by numerical value substitution of respective components of the parameter $t_i$ into said matrices U and V, respectively;

second input means for inputting respective components of said homogeneous coordinates transformation matrix $A_{hand}$ in the form of numerical value;

numerical value matrix equation derivation means for, by numerical value substitution of the respective components of said homogeneous coordinates transformation matrix $A_{hand}$ entered through said second input means into the matrix equation expressed by equation (2), deriving a numerical value matrix equation expressed by equation (3), $$U_{num} \cdot \xi \cdot (1 + x_1^2)(1 + x_2^2) = V_{num} \cdot \left[ \begin{array}{c} x_3 \cdot \rho \\ \hline \rho \end{array} \right] \quad (3)$$

where $U_{num}$ and $V_{num}$ stand for numerical value matrices produced by numerical substitution of the respective components of said homogeneous coordinates transformation matrix $A_{hand}$ into said matrices $U(A_{hand})$ and $V(A_{hand})$, respectively; and means for evaluating angles $\theta_i^{(k)}$ of rotation (k stands for positive integers to the maximum 16 for discriminating mutually between a plurality of angles $\theta_i$) of the joints on the basis of the numerical value matrix equation expressed by equation (3) to determine whether a manipulator constructed based on the simulated manipulator will operate as desired and is capable of implementing a desired position and orientation of the tip of the manipulator.

6. A manipulator simulation apparatus, embodied on a computer, adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ representative of the position and the orientation of the tip of the manipulator looking at an absolute coordinate system is expressed by $$A_{hand} = \left[ \begin{array}{c|c} C_{hand} & t_{hand} \\ \hline 0 & 1 \end{array} \right] = \left[ \begin{array}{ccc|c} n_x & s_x & a_x & p_x \\ n_y & s_y & a_y & p_y \\ n_z & s_z & a_z & p_z \\ \hline 0 & 0 & 0 & 1 \end{array} \right]$$

where $C_{hand}$ denotes an orientation, and $t_{hand}$ denotes a position, and the homogeneous coordinates transformation matrix $A_i$ representative of the position and the orientation of the (i+1)th coordinate system using the i-th coordinate system, of all the coordinate systems sequentially assigned from the rear end of the manipulator toward the top, is expressed by $$A_i = \left[ \begin{array}{c|c} C_i & C_{z,i} \cdot t_i \\ \hline 0 & 1 \end{array} \right]$$

where:

i=1, 2, . . . , 6

$C_i = C_{z,i} \cdot C_{x,i}$ $$C_{z,i} = \left[ \begin{array}{ccc} c_i & -s_i & 0 \\ s_i & c_i & 0 \\ 0 & 0 & 1 \end{array} \right]$$

$$C_{x,i} = \left[ \begin{array}{ccc} 1 & 0 & 0 \\ 0 & \lambda_i & -\mu_i \\ 0 & \mu_i & \lambda_i \end{array} \right]$$

$c_i = \cos\theta_i$, $s_i = \sin\theta_i$ $\lambda_i = \cos\alpha_i$, $\mu_i = \sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix, said apparatus comprises:

storage means for storing a matrix equation expressed by equation (2) in which respective components of said homogeneous coordinates transformation matrix $A_{hand}$ are given as variables, $$U(A_{hand}) \cdot \xi \cdot (1 + x_1^2)(1 + x_2^2) = V(A_{hand}) \cdot \left[ \begin{array}{c} x_3 \cdot \rho \\ \hline \rho \end{array} \right] \quad (2)$$

where $U(A_{hand})$ and $V(A_{hand})$ stand for matrices in which the respective components of said homogeneous coordinates transformation matrix $A_{hand}$ are given as variables, said matrices being produced by a numerical value substitution of respective components of the parameter $t_i$ into said matrices U and V, respectively, wherein said matrix equation expressed by equation (2) is obtained by a numerical value substitution of respective components of the parameter $t_i$ into a matrix equation (1) evaluated based on said homogeneous coordinates transformation matrix $A_{hand}$ and said homogeneous coordinates transformation matrix $A_i$, $$U \cdot \xi \cdot (1 + x_1^2)(1 + x_2^2) = V \cdot \left[ \begin{array}{c} x_3 \cdot \rho \\ \hline \rho \end{array} \right] \quad (1)$$

where U denotes 20×16 of real number matrix, V denotes 20×18 of real number matrix, $\xi = [x_3 s_4 s_5, x_3 s_4 c_5, x_3 c_4 s_5, x_3 c_4 c_5, x_3 s_4, x_3 c_4, x_3 s_5, x_3 c_5, s_4 s_5, s_4 c_5, c_4 s_5, c_4 c_5, s_4, c_4, s_5, c_5]^T$, $\rho = [x_1^2 x_2^2, x_1^2 x_2, x_1^2, x_1 x_2^2, x_1 x_2, x_1, x_2^2, x_2, 1]^T$, and $X_i = \tan(\theta_i/2)$;

input means for inputting respective components of said homogeneous coordinates transformation matrix $A_{hand}$;

numerical value matrix equation derivation means for, by numerical value substitution of the respective components of said homogeneous coordinates transformation matrix $A_{hand}$ entered through said input means into the matrix equation expressed by equation (2), deriving a numerical value matrix equation expressed by equation (3), $$U_{num} \cdot \xi \cdot (1 + x_1^2)(1 + x_2^2) = V_{num} \cdot \left[ \begin{array}{c} x_3 \cdot \rho \\ \hline \rho \end{array} \right] \quad (3)$$

where $U_{num}$ and $V_{num}$ stand for numerical value matrices produced by numerical substitution of the respective components of said homogeneous coordinates transformation matrix $A_{hand}$ into said matrices $U(A_{hand})$ and $V(A_{hand})$, respectively; and joint rotation angle computing means for evaluating angles $\theta_i^{(k)}$ of rotation (k stands for positive integers to the maximum 16 for discriminating mutually between a plurality of angles $\theta_i$) of the joints on the basis of the numerical value matrix equation expressed by equation (3) to determine whether a manipulator constructed based on the simulated manipulator will operate as desired and is capable of implementing a desired position and orientation of the tip of the manipulator.

7. A manipulator simulation apparatus according to claim 5, wherein said joint rotation angle computing means comprises:

means for evaluating equations, in which $\theta_4$ and $\theta_5$ are eliminated, on the basis of the numerical value matrix equation given by equation (3);

means for evaluating eigenvalue equations or generalized eigenvalue equations on the basis of the resultant equations in which $\theta_4$ and $\theta_5$ are eliminated; and means for evaluating said angles $\theta_i^{(k)}$ of rotation on the basis of the resultant eigenvalue equations or generalized eigenvalue equations.

8. A manipulator simulation apparatus, embodied on a computer, adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ representative of the position and the orientation of the tip of the manipulator looking at an absolute coordinate system is expressed by $$A_{hand} = \left[ \begin{array}{c|c} C_{hand} & t_{hand} \\ \hline 0 & 1 \end{array} \right] = \left[ \begin{array}{ccc|c} n_x & s_x & a_x & p_x \\ n_y & s_y & a_y & p_y \\ n_z & s_z & a_z & p_z \\ \hline 0 & 0 & 0 & 1 \end{array} \right]$$

where $C_{hand}$ denotes an orientation, and $t_{hand}$ denotes a position, and the homogeneous coordinates transformation matrix $A_i$ representative of the position and the orientation of the (i+1)th coordinate system using the i-th coordinate system, of all the coordinate systems sequentially assigned from the rear end of the manipulator toward the top, is expressed by $$A_i = \left[ \begin{array}{c|c} C_i & C_{z,i} \cdot t_i \\ \hline 0 & 1 \end{array} \right]$$

where:

i=1, 2, . . . , 6

$C_i = C_{z,i} \cdot C_{x,i}$ $$C_{z,i} = \begin{bmatrix} c_i & -s_i & 0 \\ s_i & c_i & 0 \\ 0 & 0 & 1 \end{bmatrix}$$

$$C_{x,i} = \begin{bmatrix} 1 & 0 & 0 \\ 0 & \lambda_i & -\mu_i \\ 0 & \mu_i & \lambda_i \end{bmatrix}$$

$c_i = \cos\theta_i$, $s_i = \sin\theta_i$ $\lambda_i = \cos\alpha_i$, $\mu_i = \sin\alpha_i$ $\theta_i$ denotes an angle of rotation of i-th joint, $\alpha_i$ denotes an angle of gradient of axis of rotation of i-th joint to an axis of rotation of i-1th joint, $t_i$ denotes a three-dimensional parameter defining a configuration of i-th link, and the homogeneous coordinates transformation matrix $A_i$ may be a unit matrix, said apparatus comprises:

storage means for storing a matrix equation (4) evaluated based on said homogeneous coordinates transformation matrix $A_{hand}$ and said homogeneous coordinates transformation matrix $A_i$, $$U \cdot \xi \cdot (1 + x_4^2)(1 + x_5^2) = V \cdot \left[ \begin{array}{c} x_3 \cdot \rho \\ \rho \end{array} \right] \quad (4)$$

where U denotes 20×16 of real number matrix, V denotes 20×18 of real number matrix, $\xi = [x_3 s_1 s_2, x_3 s_1 c_2, x_3 c_1 s_2, x_3 c_1 c_2, x_3 s_1, x_3 c_1, x_3 s_2, x_3 c_2, s_1 s_2, s_1 c_2, c_1 s_2, c_1 c_2, s_1, c_1, s_2, c_2]^T$ $\rho = [x_4^2 x_5^2, x_4^2 x_5, x_4^2, x_4 x_5^2, x_4 x_5, x_4, x_5^2, x_5, 1]^T$ $x_i = \tan(\theta_i/2)$, first input means for inputting respective components of the parameter $t_i$ in the form of numerical value;

parameter numerical value substitution means for, by a numerical value substitution of respective components of the parameter $t_i$ entered through said first input means into the matrix equation expressed by equation (4), deriving a matrix equation expressed by equation (5) in which respective components of said homogeneous coordinates transformation matrix $A_{hand}$ are given as variables, $$U(A_{hand}) \cdot \xi \cdot (1 + x_4^2)(1 + x_5^2) = V(A_{hand}) \cdot \left[ \begin{array}{c} x_3 \cdot \rho \\ \rho \end{array} \right] \quad (5)$$

where $U(A_{hand})$ and $V(A_{hand})$ stand for matrices in which the respective components of said homogeneous coordinates transformation matrix $A_{hand}$ are given as variables, said matrices being produced by numerical value substitution of respective components of the parameter $t_i$ into said matrices U and V, respectively;

second input means for inputting respective components of said homogeneous coordinates transformation matrix $A_{hand}$;

numerical value matrix equation derivation means for, by numerical value substitution of the respective components of said homogeneous coordinates transformation matrix $A_{hand}$ entered through said second input means into the matrix equation expressed by equation (5), deriving a numerical value matrix equation expressed by equation (6), $$U_{num} \cdot \xi \cdot (1 + x_4^2)(1 + x_5^2) = V_{num} \cdot \left[ \begin{array}{c} x_3 \cdot \rho \\ \rho \end{array} \right] \quad (6)$$

where $U_{num}$ and $V_{num}$ stand for numerical value matrices produced by numerical substitution of the respective components of said homogeneous coordinates transformation matrix $A_{hand}$ into said matrices $U(A_{hand})$ and $V(A_{hand})$, respectively; and joint rotation angle computing means for evaluating angles $\theta_i^{(k)}$ of rotation (k stands for positive integers to the maximum 16 for discriminating mutually between a plurality of angles $\theta_i$) of the joints on the basis of the numerical value matrix equation expressed by equation (6) to determine whether a manipulator constructed based on the simulated manipulator will operate as desired and is capable of implementing a desired position and orientation of the tip of the manipulator.

9. A manipulator simulation apparatus, embodied on a computer, adapted to evaluate angles of rotation of joints for coupling arm-to-arm to each other on the basis of information representative of position and orientation of a tip of a manipulator having six or less arms, which are sequentially coupled with each other, so as to implement the position and the orientation of the tip of the manipulator, wherein when a homogeneous coordinates transformation matrix $A_{hand}$ representative of the position and the orientation of the tip of the manipulator looking at an absolute coordinate system is expressed by $$A_{hand} = \left[\begin{array}{c|c} C_{hand} & t_{hand} \\ \hline 0 & 1 \end{array}\right] = \left[\begin{array}{ccc|c} n_x & s_x & a_x & p_x \\ n_y & s_y & a_y & p_y \\ n_z & s_z & a_z & p_z \\ \hline 0 & 0 & 0 & 1 \end{array}\right]$$

where $C_{hand}$ denotes an orientation, and
$t_{hand}$ denotes a position, and the homogeneous coordinates transformation matrix $A_i$ representative of the position and the orientation of the (i+1)th coordinate system using the i-th coordinate system, of all the coordinate systems sequentially assigned from the rear end of the manipulator toward the top, is expressed by $$A_i = \left[\begin{array}{c|c} C_i & C_{z,i} \cdot t_i \\ \hline 0 & 1 \end{array}\right]$$

where:
i=1, 2, ..., 6
$C_i = C_{z,i} \cdot C_{x,i}$ $$C_{z,i} = \begin{bmatrix} c_i & -s_i & 0 \\ s_i & c_i & 0 \\ 0 & 0 & 1 \end{bmatrix}$$

$$C_{x,i} = \begin{bmatrix} 1 & 0 & 0 \\ 0 & \lambda_i & -\mu_i \\ 0 & \mu_i & \lambda_i \end{bmatrix}$$

$c_i = \cos\theta_i$, $s_i = \sin\theta_i$,
$\lambda_i = \cos\alpha_i$, $\mu_i = \sin\alpha_i$,
$\theta_i$ denotes an angle of rotation of i-th joint,
$\alpha_i$ denotes an angle of gradient of axis of rotation of i-th joint to an axis of rotation of i-1th joint,
$t_i$ denotes a three-dimensional parameter defining a configuration of i-th link, and
the homogeneous coordinates transformation matrix $A_i$ may be a unit matrix,
said apparatus comprises:
storage means for storing a matrix equation expressed by equation (5) in which respective components of said homogeneous coordinates transformation matrix $A_{hand}$ are given as variables, $$U(A_{hand}) \cdot \xi \cdot (1 + x_4^2)(1 + x_5^2) = V(A_{hand}) \cdot \left[\begin{array}{c} x_3 \cdot \rho \\ \rho \end{array}\right] \quad (5)$$

where $U(A_{hand})$ and $V(A_{hand})$ stand for matrices in which the respective components of said homogenous coordinates transformation matrix $A_{hand}$ are given as variables, said matrices being produced by a numerical value substitution of respective components of the parameter $t_i$ into said matrices U and V, respectively, wherein said matrix equation expressed by equation (5) is obtained by a numerical value substitution of respective components of the parameter $t_i$ into a matrix equation (4) evaluated based on said homogeneous coordinates transformation matrix $A_{hand}$ and said homogenous coordinates transformation matrix $A_i$, $$U \cdot \xi \cdot (1 + x_4^2)(1 + x_5^2) = V \cdot \left[\begin{array}{c} x_3 \cdot \rho \\ \rho \end{array}\right] \quad (4)$$

where U denotes 20×16 of real number matrix, V denotes 20×18 of real number matrix, $\xi = [x_3 s_1 s_2, x_3 s_1 c_2, x_3 c_1 s_2, x_3 c_1 c_2, x_3 s_1, x_3 c_1, x_3 s_2, x_3 c_2, s_1 s_2, s_1 c_2, c_1 s_2, c_1 c_2, s_1, c_1, s_2, c_2]^T$ $\rho = [x_4^2 x_5^2, x_4^2 x_5, x_4^2, x_4 x_5^2, x_4 x_5, x_4, x_5^2, x_5, 1]^T$ $X_i = \tan(\theta_i/2)$;

input means for inputting respective components of said homogeneous coordinates transformation matrix $A_{hand}$;

numerical value matrix equation derivation means for, by numerical value substitution of the respective components of said homogeneous coordinates transformation matrix $A_{hand}$ entered through said input means into the matrix equation expressed by equation (5), deriving a numerical value matrix equation expressed by equation (6), $$U_{num} \cdot \xi \cdot (1 + x_4^2)(1 + x_5^2) = V_{num} \cdot \left[\begin{array}{c} x_3 \cdot \rho \\ \rho \end{array}\right] \quad (6)$$

where $U_{num}$ and $V_{num}$ stand for numerical value matrices produced by numerical substitution of the respective components of said homogeneous coordinates transformation matrix $A_{hand}$ into said matrices $U(A_{hand})$ and $V(A_{hand})$, respectively; and joint rotation angle computing means for evaluating angles $\theta_i^{(k)}$ of rotation (k stands for positive integers to the maximum 16 for discriminating mutually between a plurality of angles $\theta_i$) of the joints on the basis of the numerical value matrix equation expressed by equation (6) to determine whether a manipulator constructed based on the simulated manipulator will operate as desired and is capable of implementing a desired position and orientation of the tip of the manipulator.

10. A manipulator simulation apparatus according to claim 8, wherein said joint rotation angle computing means comprises;

means for evaluating equations, in which $\theta_1$ and $\theta_2$ are eliminated, on the basis of the numerical value matrix equation given by equation (6);

means for evaluating eigenvalue equations or generalized eigenvalue equations on the basis of the resultant equations in which $\theta_1$ and $\theta_2$ are eliminated; and means for evaluating said angles $\theta_i^{(k)}$ of rotation on the basis of the resultant eigenvalue equations or generalized eigenvalue equations.

11. A manipulator simulation apparatus according to claim 9, wherein said joint rotation angle computing means comprises;

means for evaluating equations, in which $\theta_1$ and $\theta_2$ are eliminated, on the basis of the numerical value matrix equation given by equation (6);

means for evaluating eigenvalue equations or generalized eigenvalue equations on the basis of the resultant equations in which $\theta_1$ and $\theta_2$ are eliminated; and means for evaluating said angles $\theta_i^{(k)}$ of rotation on the basis of the resultant eigenvalue equations or generalized eigenvalue equations.

12. A manipulator simulation apparatus according to claim 6, wherein said joint rotation angle computing means comprises;

means for evaluating equations, in which $\theta_4$ and $\theta_5$ are eliminated, on the basis of the numerical value matrix equation given by equation (3);

means for evaluating eigenvalue equations or generalized eigenvalue equations on the basis of the resultant equations in which $\theta_4$ and $\theta_5$ are eliminated; and means for evaluating said angles $\theta_i^{(k)}$ of rotation on the basis of the resultant eigenvalue equations or generalized eigenvalue equations.

* * * * *